(12) United States Patent
Kobashi

(10) Patent No.: US 11,726,733 B2
(45) Date of Patent: Aug. 15, 2023

(54) INFORMATION PROCESSING APPARATUS AND METHOD OF CONTROLLING THE SAME

(71) Applicant: CANON KABUSHIKI KAISHA, Tokyo (JP)

(72) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/496,633

(22) Filed: Oct. 7, 2021

(65) Prior Publication Data

US 2022/0027109 A1 Jan. 27, 2022

Related U.S. Application Data

(63) Continuation of application No. 16/557,854, filed on Aug. 30, 2019, now Pat. No. 11,163,512.

(30) Foreign Application Priority Data

Sep. 7, 2018 (JP) .................................. 2018-168166

(51) Int. Cl.
*G06F 3/12* (2006.01)
*H04N 1/00* (2006.01)

(52) U.S. Cl.
CPC .......... *G06F 3/1275* (2013.01); *G06F 3/1204* (2013.01); *H04N 1/0048* (2013.01); *H04N 1/00411* (2013.01); *H04N 1/00413* (2013.01); *H04N 1/00466* (2013.01); *H04N 1/00482* (2013.01)

(58) Field of Classification Search
CPC . G06F 3/1275; G06F 3/1204; H04N 1/00411; H04N 1/00413; H04N 1/00466; H04N 1/0048; H04N 1/00482
See application file for complete search history.

(56) References Cited

U.S. PATENT DOCUMENTS

| | | | | |
|---|---|---|---|---|
| 2001/0030755 A1 ‡ | 10/2001 | Yamade | ............... | B41J 2/17566 |
| | | | | 358/1.1 |
| 2004/0193717 A1 ‡ | 9/2004 | Tajima | ............... | H04N 1/32545 |
| | | | | 709/228 |
| 2009/0006989 A1 ‡ | 1/2009 | Park | ................... | H04N 1/00464 |
| | | | | 358/1.13 |
| 2009/0097060 A1 ‡ | 4/2009 | Okada | ................ | G03G 15/5087 |
| | | | | 358/1.15 |
| 2009/0323096 A1 ‡ | 12/2009 | Oshima | .................. | G06Q 10/06 |
| | | | | 358/1.13 |

(Continued)

FOREIGN PATENT DOCUMENTS

| | | | | |
|---|---|---|---|---|
| CN | 101000535 A | | 7/2007 | |
| EP | 3113010 A1 ‡ | | 1/2017 | ........... G06F 3/1204 |

(Continued)

*Primary Examiner* — Moustapha Diaby
(74) *Attorney, Agent, or Firm* — Canon U.S.A., Inc., IP Division

(57) ABSTRACT

A setting screen for adding an operation process and setting a parameter related to the operation process is displayed. Via the setting screen, accepting of an instruction to add an operation process and setting of a parameter of the operation process are performed. A workflow is generated so as to include the operation process instructed to be added and information on the parameter of the set process.

14 Claims, 34 Drawing Sheets

(56) References Cited

U.S. PATENT DOCUMENTS

| | | | | |
|---|---|---|---|---|
| 2010/0028035 | A1 ‡ | 2/2010 | Nishikata | G03G 15/2042 |
| | | | | 399/67 |
| 2011/0058840 | A1 ‡ | 3/2011 | Tsujita | G03G 15/5012 |
| | | | | 399/82 |
| 2012/0106761 | A1 ‡ | 5/2012 | Tseng | H04R 3/06 |
| | | | | 381/431 |
| 2012/0246565 | A1 ‡ | 9/2012 | Kumamoto | G06F 8/38 |
| | | | | 715/273 |
| 2012/0307296 | A1 | 12/2012 | Sato | |
| 2012/0317156 | A1 ‡ | 12/2012 | Tomita | G06F 9/544 |
| | | | | 707/812 |
| 2014/0240754 | A1 ‡ | 8/2014 | Smyth | G06F 3/1204 |
| | | | | 358/1.15 |
| 2015/0221008 | A1 * | 8/2015 | Karni | G06Q 10/10 |
| | | | | 705/26.5 |

FOREIGN PATENT DOCUMENTS

| | | | | | |
|---|---|---|---|---|---|
| JP | 2003276150 | A | | 9/2003 | |
| JP | 2010009243 | A | | 1/2010 | |
| JP | 2014-164765 | A | ‡ | 9/2014 | G06F 3/1204 |
| KR | 20170024488 | A | | 3/2017 | |
| RU | 2574853 | C2 | ‡ | 2/2016 | G03G 15/0189 |

\* cited by examiner
‡ imported from a related application

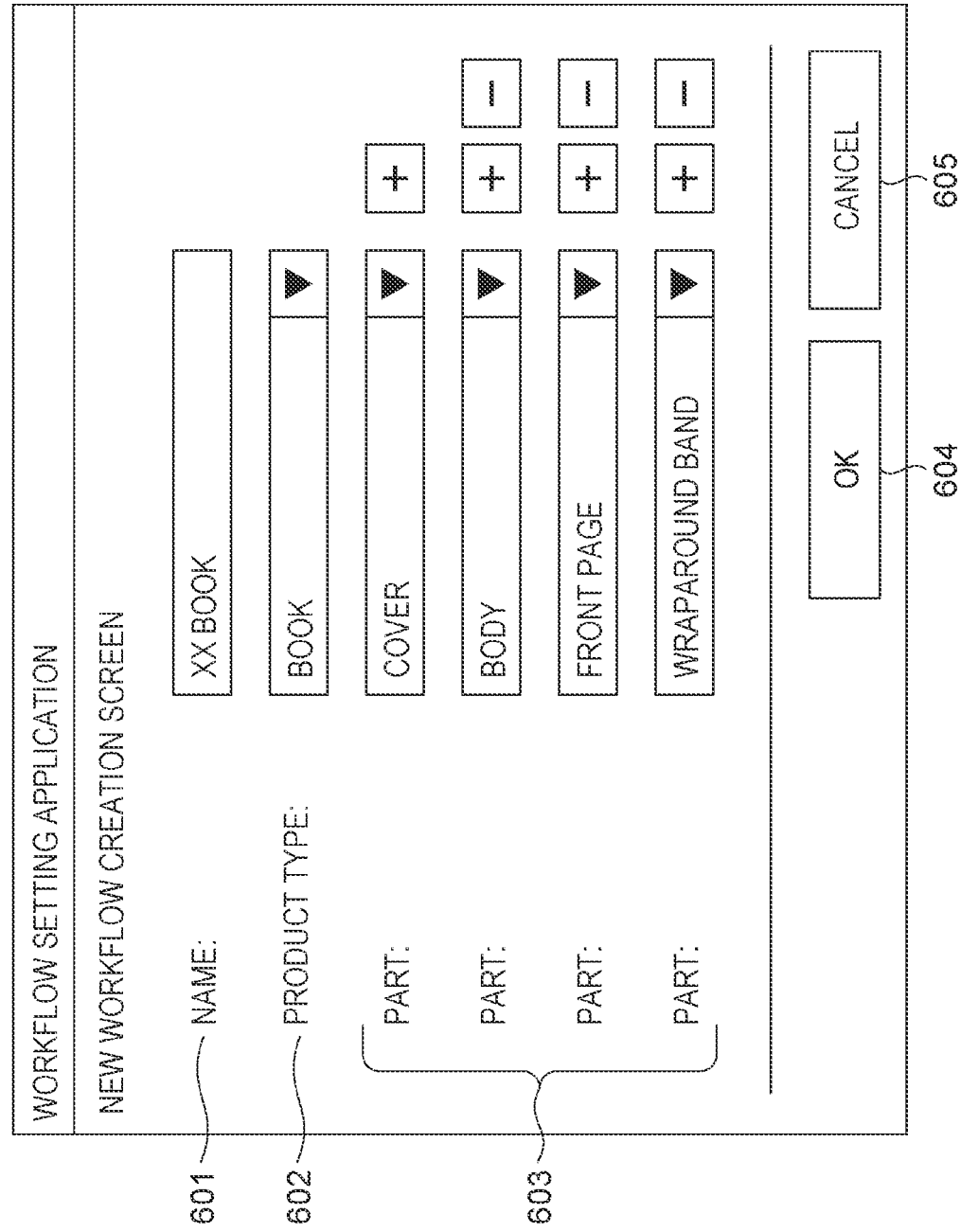

FIG. 5A

| PART | PREPRESS | | | | | PRESS | POSTPRESS | | | | |
|---|---|---|---|---|---|---|---|---|---|---|---|
| | IMPOSITION | BARCODE | TEXT | IMAGE | REGISTER MARK | MARK | PRINT | FOLDING | CUT & CREASE | SADDLE STITCHING | PERFECT BINDING | THREE-SIDE CUTTING |
| COVER | A | A | A | A | A | A | A | A | A | NA | NA | A |
| BODY | A | A | A | A | A | A | A | A | A | A | A | A |
| WRAPAROUND BAND | A | A | A | A | A | A | A | A | A | NA | NA | A |
| ... | ... | ... | ... | ... | ... | ... | ... | ... | ... | ... | ... | ... |

A: ALLOWED
NA: NOT ALLOWED

FIG. 5B

| PROCESS | PREPRESS | | | | | | PRESS | POSTPRESS | | | | |
|---|---|---|---|---|---|---|---|---|---|---|---|---|
| | IMPOSITION | BARCODE | TEXT | IMAGE | REGISTER MARK | MARK | PRINT | FOLDING | CUT & CREASE | SADDLE STITCHING | PERFECT BINDING | THREE-SIDE CUTTING |
| ESSENTIAL | ON | OFF | OFF | OFF | OFF | OFF | ON | OFF | OFF | OFF | OFF | OFF |
| MULTIPLE | NO | YES | YES | YES | YES | YES | NO | NO | NO | NO | NO | NO |
| ORDER | 1 | 2 | 3 | 4 | 5 | 6 | 1 | 1 | 2 | 3 | 3 | 4 |

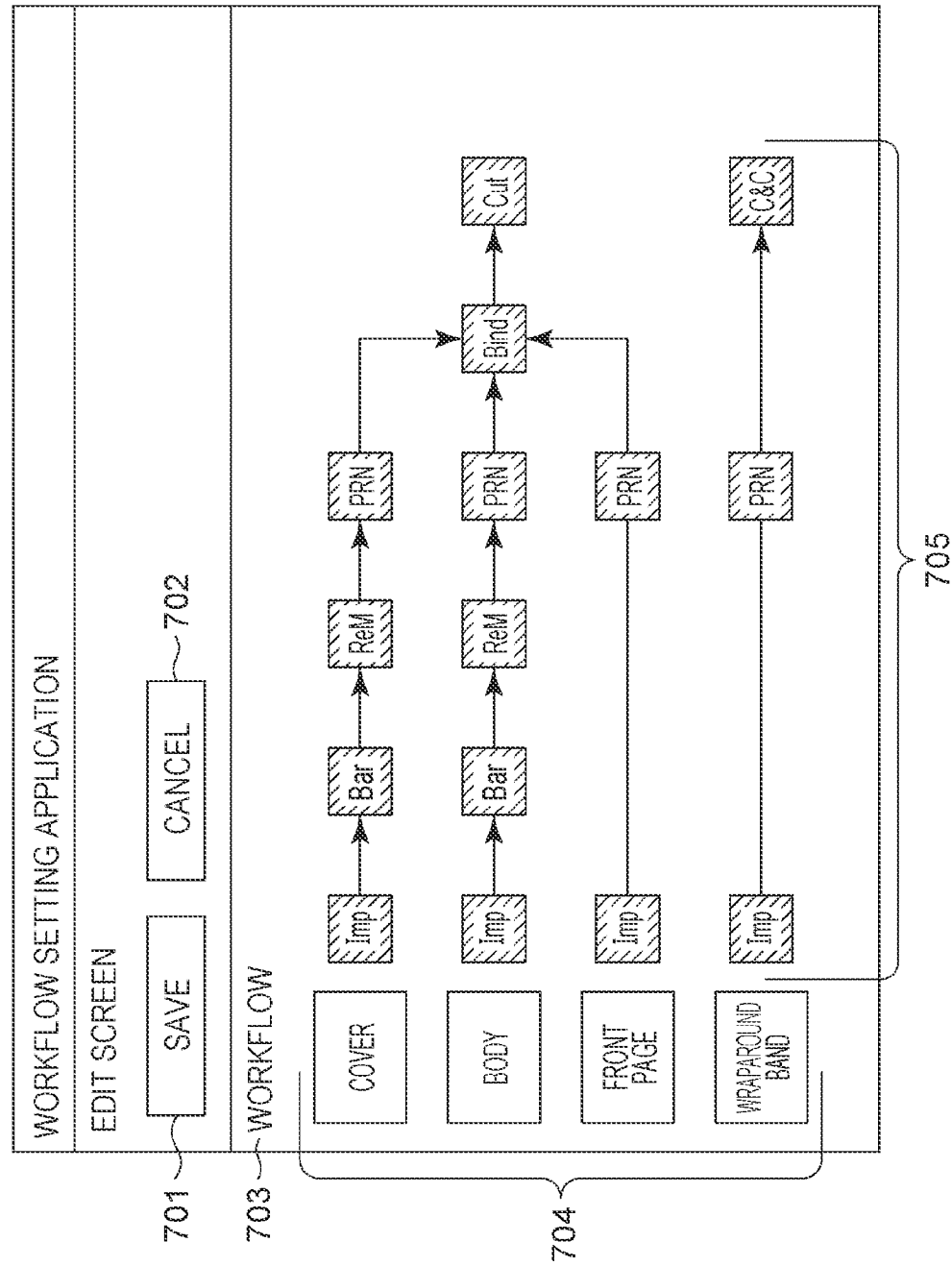

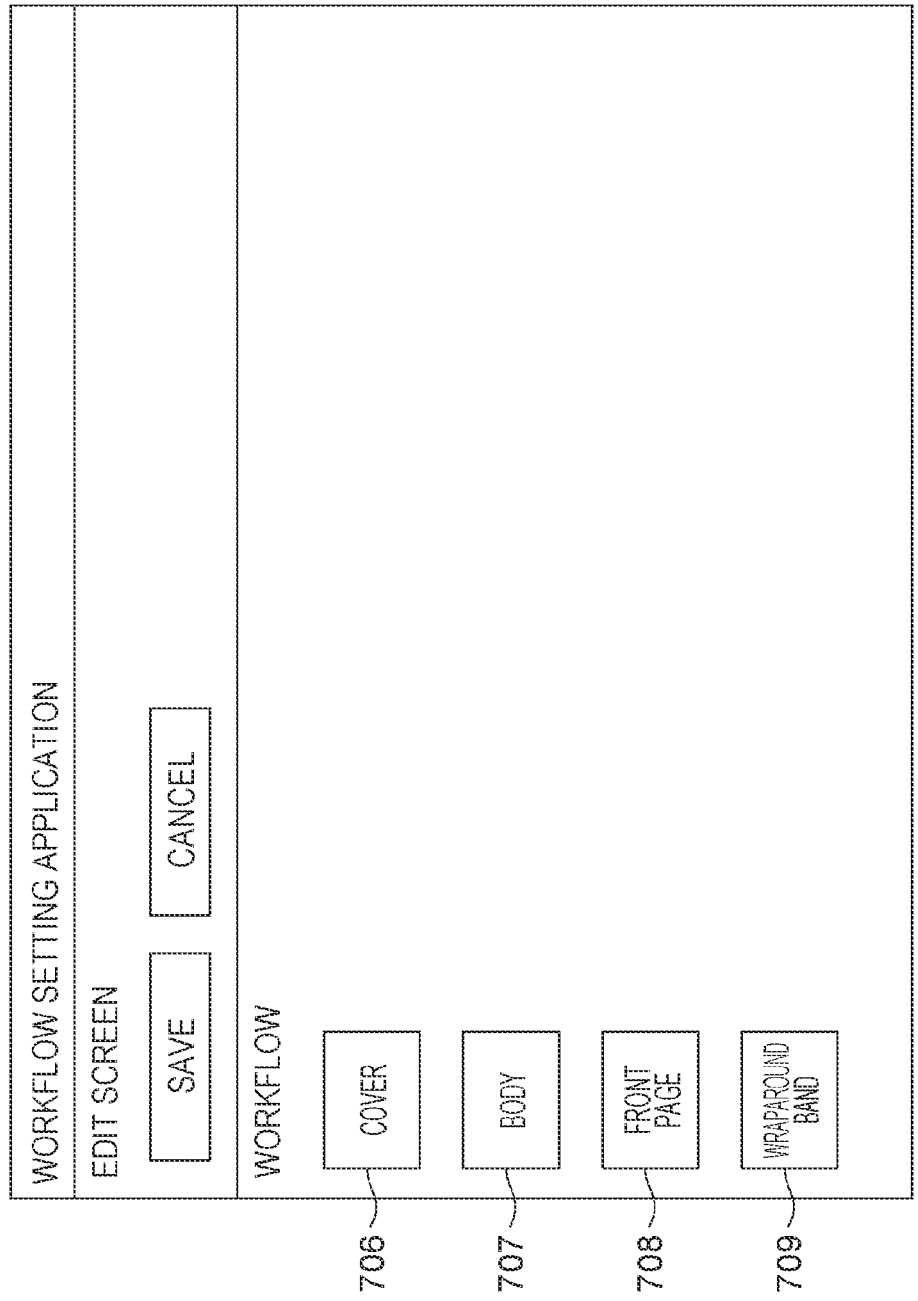

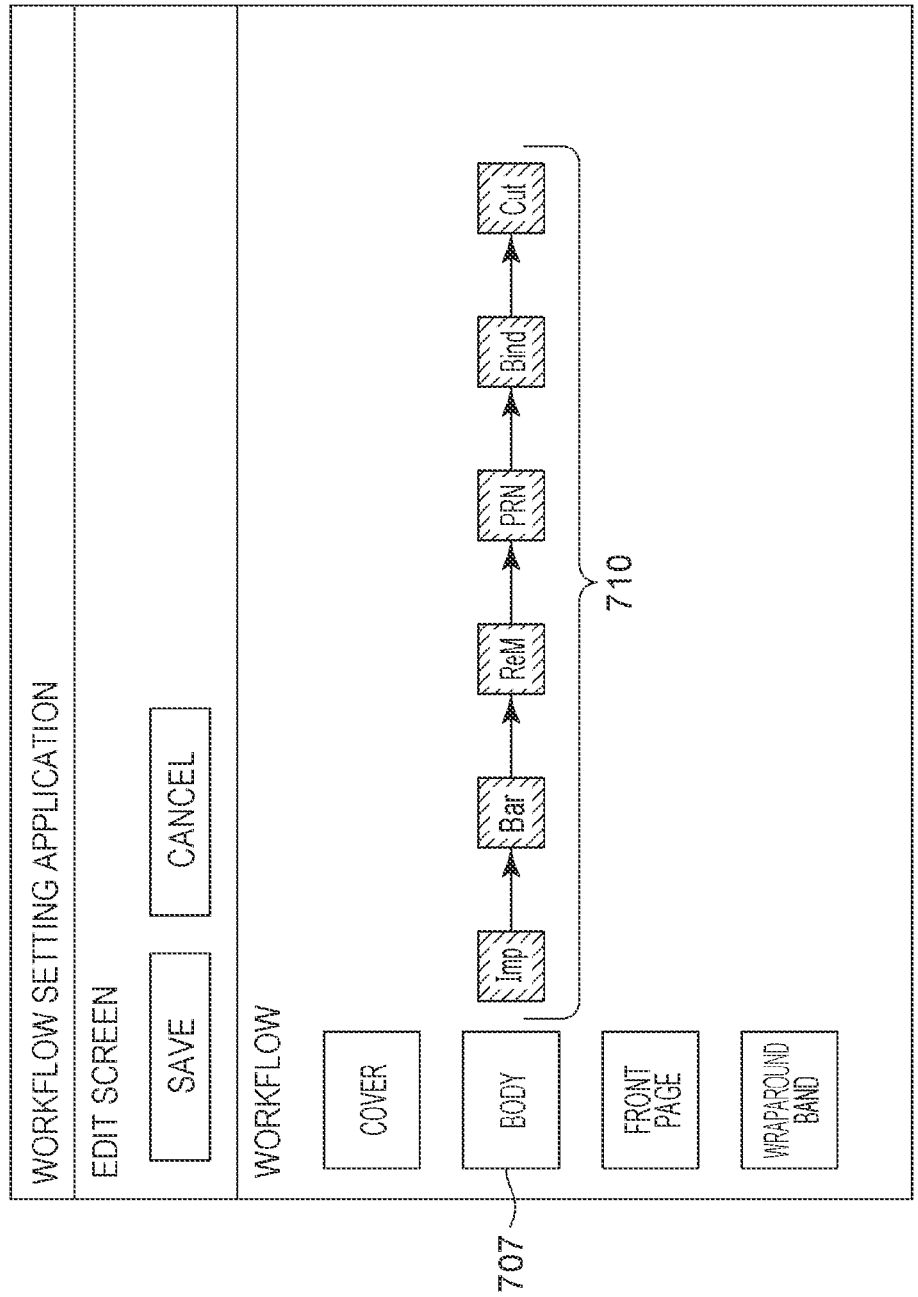

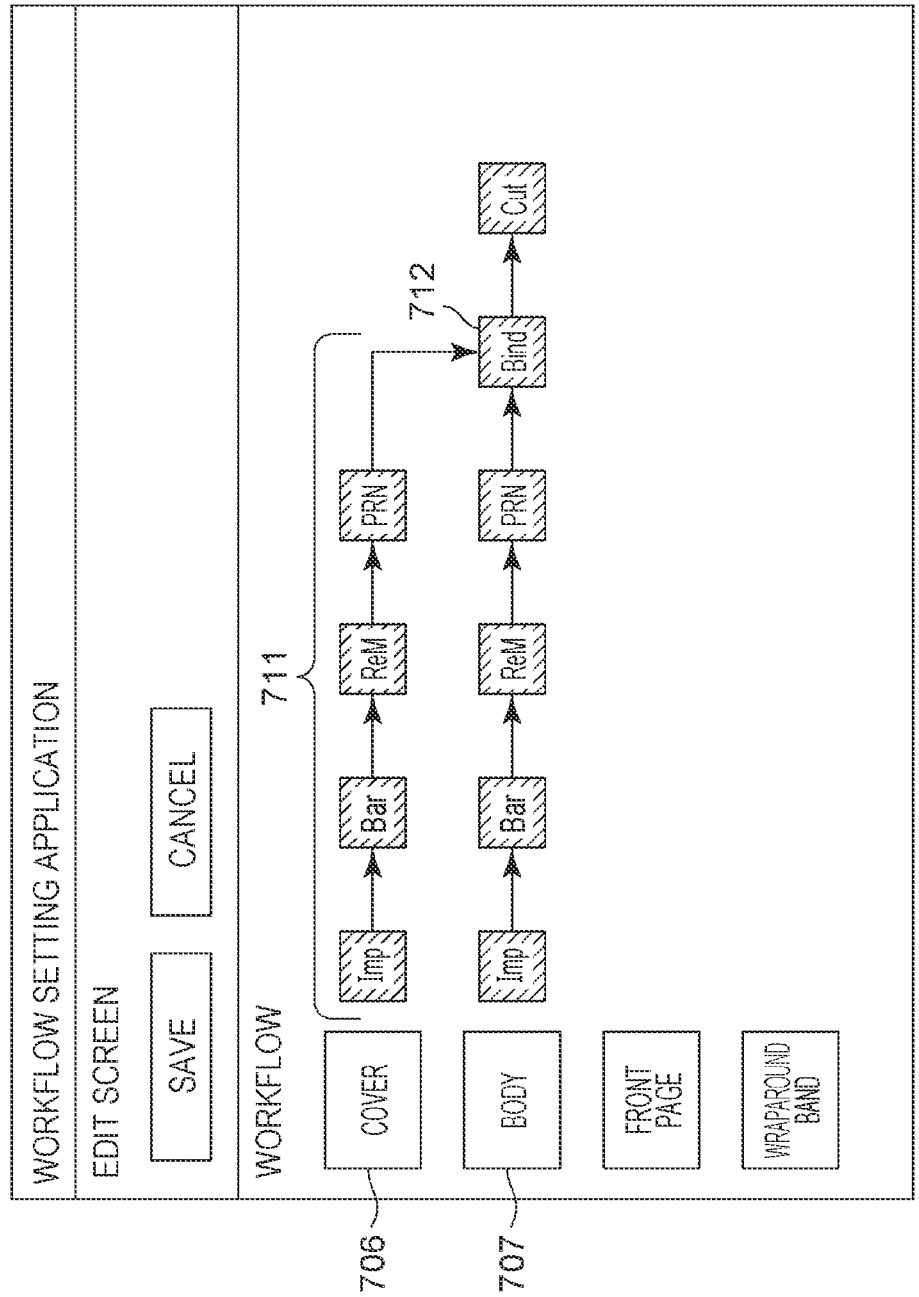

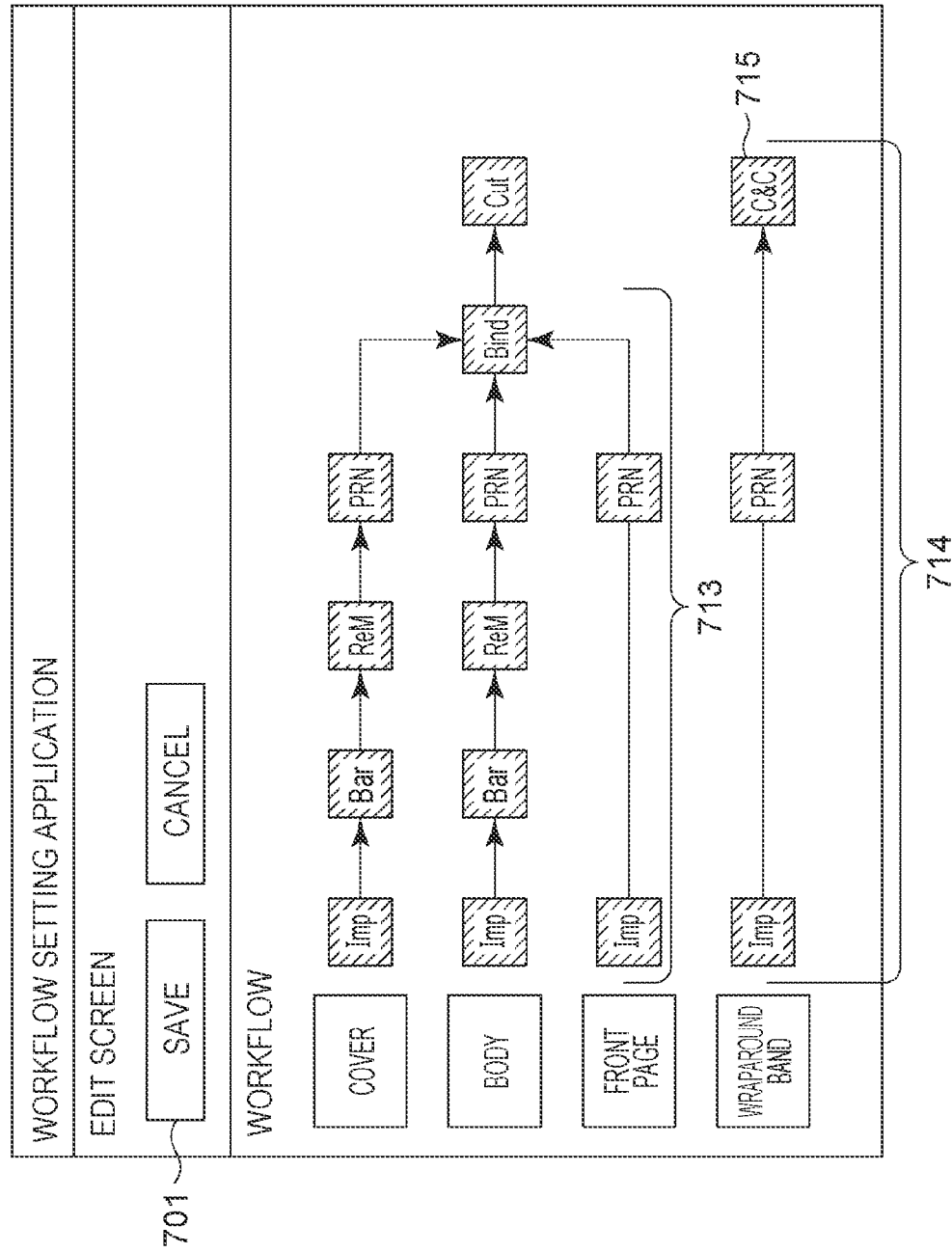

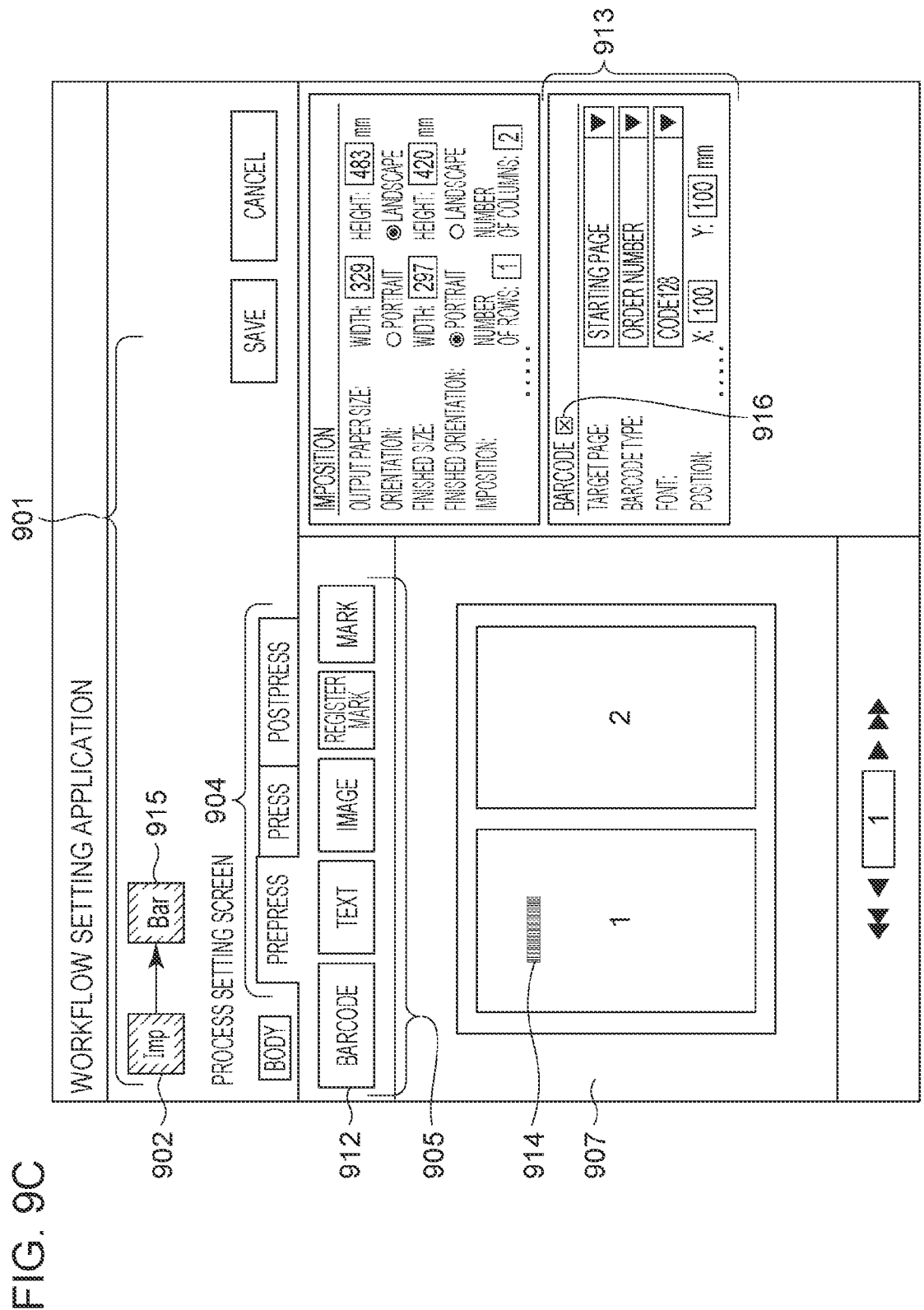

FIG. 10

| PRODUCT | PART | | | | |
|---|---|---|---|---|---|
| BOOK | COVER | BODY | FRONT PAGE | WRAPAROUND BAND | – |
| BUSINESS CARD | BODY | – | – | – | – |
| CATALOG | COVER | BODY | – | – | – |
| ... | ... | ... | ... | ... | ... |

FIG. 12

| ID | NAME | PRODUCT TYPE | PART #1 | ID OF PART #1 | PART #2 | ID OF PART #2 | PART #3 | ID OF PART #3 | PART #4 | ID OF PART #4 |
|---|---|---|---|---|---|---|---|---|---|---|
| 001 | xxx MANUAL | MANUAL | COVER | 001-C001 | BODY | 001-B001 | - | - | - | - |
| 002 | LEAFLET xxxx | LEAFLET | BODY | 002-B001 | - | - | - | - | - | - |
| 003 | xxxxx CATALOG | CATALOG | COVER | 003-C001 | BODY | 003-B001 | - | - | - | - |
| 004 | xxx BOOKLET | BOOKLET | COVER | 004-C001 | BODY | 004-B001 | FRONT PAGE | 004-T001 | WRAPAROUND BAND | 004-BB001 |
| 005 | ADVERTISEMENT SIGN xxxx | ADVERTISEMENT SIGN | BODY | 005-B001 | - | - | - | - | - | - |
| ... | ... | ... | ... | ... | ... | ... | ... | ... | ... | ... |

FIG. 13A

| ID | PREPRESS ||||||||||| PRESS ||
| | IMPOSITION |||| BARCODE || REGISTER MARK || | PRINT ||
| | PAPER WIDTH | PAPER HEIGHT | PAPER ORIENTATION | FINISHED WIDTH | FINISHED HEIGHT | FINISHED ORIENTATION | PAGE | FONT | TRIM | CENTER | ... | PAPER OUTPUT DESTINATION | PAPER TYPE |
|---|---|---|---|---|---|---|---|---|---|---|---|---|---|
| 001-C001 | 329 | 483 | LANDSCAPE | 297 | 420 | LANDSCAPE | — | — | ON | CENTER | ... | TRAY #1 | THICK NORMAL |
| 003-C001 | 329 | 483 | LANDSCAPE | 297 | 420 | LANDSCAPE | — | — | ON | ON | ... | AUTO | PLAIN NORMAL |
| 004-C001 | 329 | 483 | LANDSCAPE | 297 | 420 | LANDSCAPE | — | — | ON | ON | ... | TRAY #2 | COATED |
| ... | ... | ... | ... | ... | ... | ... | ... | ... | ... | ... | ... | ... | ... |

| POSTPRESS |||||||||||||
| FOLD || CUT & CREASE || SADDLE STITCH || PERFECT BINDING || THREE-SIDE CUTTING |||
| TRANSPORT DIRECTION | FOLDING MODE | X1 | Y1 | ... | TARGET PART #1 | TARGET PART #2 | ... | TARGET PART #1 | TARGET PART #2 | ... | WIDTH BEFORE BEING CUT | HEIGHT BEFORE BEING CUT | WIDTH AFTER BEING CUT |
|---|---|---|---|---|---|---|---|---|---|---|---|---|---|
| — | — | — | — | ... | — | — | ... | — | — | ... | — | — | — |
| — | — | — | — | ... | — | — | ... | — | — | ... | — | — | — |
| — | — | — | — | ... | — | — | ... | — | — | ... | — | — | — |
| ... | ... | ... | ... | ... | ... | ... | ... | ... | ... | ... | ... | ... | ... |

FIG. 13B

| ID | PREPRESS ||||||||||| PRESS ||
| | IMPOSITION ||||| BARCODE || REGISTER MARK || | PRINT |
| | PAPER WIDTH | PAPER HEIGHT | PAPER ORIENTATION | FINISHED WIDTH | FINISHED HEIGHT | FINISHED ORIENTATION | ... | PAGE | FONT | TRIM | REGISTER MARK | PAPER OUTPUT DESTINATION | PAPER TYPE | ... |
|---|---|---|---|---|---|---|---|---|---|---|---|---|---|---|
| 001-B001 | 224 | 335 | PORTRAIT | 210 | 297 | PORTRAIT | ... | — | — | ON | CENTER | AUTO | PLAIN NORMAL | ... |
| 002-B001 | 224 | 335 | PORTRAIT | 210 | 297 | PORTRAIT | ... | — | — | ON | ON | AUTO | PLAIN NORMAL | ... |
| 003-B001 | 224 | 335 | PORTRAIT | 210 | 297 | PORTRAIT | ... | FIRST | CODE 64 | ON | ON | AUTO | PLAIN NORMAL | ... |
| 004-B001 | 224 | 335 | PORTRAIT | 210 | 297 | PORTRAIT | ... | FIRST | CODE 128 | ON | ON | TRAY #2 | COATED | ... |
| 005-B001 | 329 | 483 | LANDSCAPE | 297 | 420 | LANDSCAPE | ... | — | — | ON | ON | TRAY #2 | PLAIN NORMAL | ... |
| ... | ... | ... | ... | ... | ... | ... | ... | ... | ... | ... | ... | ... | ... | ... |

| | POSTPRESS ||||||||||||
| | F&D || CUT & CREASE ||| SADDLE STITCH || PERFECT BINDING || THREE-SIDE CUTTING |||
| TRANSPORT DIRECTION | FOLDING MODE | ... | X1 | Y1 | ... | TARGET PART #1 | TARGET PART #2 | ... | TARGET PART #1 | TARGET PART #2 | ... | WIDTH BEFORE BEING CUT | HEIGHT BEFORE BEING CUT | WIDTH AFTER BEING CUT |
|---|---|---|---|---|---|---|---|---|---|---|---|---|---|---|
| — | — | ... | — | — | ... | 001-C001 | — | ... | — | — | ... | — | — | — |
| LEFT | F2-1 | ... | — | — | ... | — | — | ... | — | — | ... | — | — | — |
| — | — | ... | — | — | ... | 003-C001 | — | ... | — | — | ... | — | — | — |
| — | — | ... | — | — | ... | — | — | ... | 004-C001 | 004-T001 | ... | — | — | — |
| — | — | ... | — | — | ... | — | — | ... | — | — | ... | 329 | 483 | 297 |
| ... | ... | ... | ... | ... | ... | ... | ... | ... | ... | ... | ... | ... | ... | ... |

FIG. 13C

| ID | PREPRESS | | | | | | | | | PRESS | | |
|---|---|---|---|---|---|---|---|---|---|---|---|---|
| | IMPOSITION | | | | BARCODE | | REGISTER MARK | | | PRINT | | |
| | PAPER WIDTH | PAPER HEIGHT | PAPER ORIENTATION | FINISHED WIDTH | FINISHED HEIGHT | FINISHED ORIENTATION | ... | PAGE | FONT | ... | TRIM | CENTER | ... | PAPER OUTPUT DESTINATION | PAPER TYPE | ... |
| 004-T001 | 224 | 335 | PORTRAIT | 210 | 297 | PORTRAIT | ... | - | - | ... | ON | ON | ... | TRAY #1 | PLAIN NORMAL | ... |
| ... | ... | ... | ... | ... | ... | ... | ... | ... | ... | ... | ... | ... | ... | ... | ... | ... |

| POSTPRESS | | | | | | | | | | | | |
|---|---|---|---|---|---|---|---|---|---|---|---|---|
| FOLD | | CUT & CREASE | | | SADDLE STITCH | | | PERFECT BINDING | | | THREE-SIDE CUTTING | | |
| TRANSPORT DIRECTION | FOLDING MODE | X1 | Y1 | ... | TARGET PART #1 | TARGET PART #2 | ... | TARGET PART #1 | TARGET PART #2 | ... | WIDTH BEFORE BEING CUT | HEIGHT BEFORE BEING CUT | WIDTH AFTER BEING CUT | ... |
| - | - | - | - | ... | - | - | ... | - | - | ... | - | - | - | ... |
| ... | ... | ... | ... | ... | ... | ... | ... | ... | ... | ... | ... | ... | ... | ... |

FIG. 13D

| ID | PREPRESS ||||||||||| PRESS |||
|---|---|---|---|---|---|---|---|---|---|---|---|---|---|---|
| | IMPOSITION ||||| ... | BARCODE || REGISTER MARK || ... | PRINT || ... |
| | PAPER WIDTH | PAPER HEIGHT | PAPER ORIENTATION | FINISHED WIDTH | FINISHED HEIGHT | FINISHED ORIENTATION | ... | PAGE | FONT | TRIM | CENTER | ... | PAPER OUTPUT DESTINATION | PAPER TYPE | ... |
| 004-BB001 | 594 | 80 | PORTRAIT | 560 | 60 | PORTRAIT | ... | — | — | ON | ON | ... | TRAY #1 | COATED | ... |

| POSTPRESS |||||||||||||||
|---|---|---|---|---|---|---|---|---|---|---|---|---|---|---|
| FOLD ||| ... | CUT & CREASE ||| ... | SADDLE STITCH || PERFECT BINDING || ... | THREE-SIDE CUTTING ||| ... |
| TRANSPORT DIRECTION | FOLDING MODE | ... | ... | X1 | Y1 | ... | ... | TARGET PART #1 | TARGET PART #2 | TARGET PART #1 | TARGET PART #2 | ... | WIDTH BEFORE BEING CUT | HEIGHT BEFORE BEING CUT | WIDTH AFTER BEING CUT | ... |
| — | — | ... | ... | 20 | 5 | ... | ... | — | — | — | — | ... | — | — | — | ... |

INFORMATION PROCESSING APPARATUS AND METHOD OF CONTROLLING THE SAME

CROSS REFERENCE OF RELATED APPLICATIONS

This application is a continuation of U.S. patent application Ser. No. 16/557,854, filed Aug. 30, 2019 which claims the benefit of Japanese Patent Application No. 2018-168166, filed Sep. 7, 2018, all of which are hereby incorporated by reference herein in its entirety.

BACKGROUND OF THE INVENTION

Field of the Invention

The present invention relates to setting of a workflow for generating a product in commercial printing.

Description of the Related Art

In print workflow software disclosed in Japanese Patent Laid-Open No. 2014-164765, setting of a workflow is performed by freely connecting icons indicating processes using a graphical user interface (GUI).

In the commercial printing industry, a product is obtained via operation processes including prepress (imposition of content data, forming of register marks, forming of a barcode), press (printing process by an image forming apparatus), and postpress (post processing by a post-processing apparatus). There are various forms of products, and there are various types of products such as oddments (business cards, leaflets), books (saddle binding, perfect binding, etc.). Parts that may constitute a product include a body, a cover, a front page, a jacket, wraparound band, and the like. Furthermore, in generating a product, not only print settings, but also prepress and postpress parameter settings (for example, pre-processing settings such as barcode forming, folding, cutting, and/or the like to be performed before printing, and setting of post-processing to be performed after printing).

When a workflow for obtaining a product in commercial printing is generated, it is necessary not only to add required processes for each part but also to set parameters of the respective processes. In particular, in commercial printing, the number of processes and the number of items to be set in each process are generally large, which makes it complicated to generating a workflow, and thus it becomes difficult for a user to easily make settings Although Japanese Patent Laid-Open No. 2014-164765 discloses that a process is added by using a graphical user interface, no consideration is given to parameter setting of each process.

SUMMARY OF THE INVENTION

In view of the above, the present invention provides a user interface for use in generating a workflow, which allows a user to easily set a process and to easily set a parameter of the process.

The present invention provides an information processing apparatus configured to generate a workflow including a plurality of operation processes combined together for generating a product, including a first display control unit configured to display a setting screen for adding an operation process and setting a parameter related to the operation process, an accepting unit configured to accept an instruction to add an operation process via the setting screen, a first setting unit configured to set a parameter related to an operation process via the setting screen, and a first generation unit configured to generate a workflow including the operation process added according to the instruction and the set parameter related to the operation process.

Further features of the present invention will become apparent from the following description of exemplary embodiments with reference to the attached drawings.

BRIEF DESCRIPTION OF THE DRAWINGS

FIGS. 3A and 3B illustrate an example of a workflow management screen and an example of a new workflow creation screen.

FIGS. 5A and 5B are diagrams illustrating an example of a process management table and an example of a workflow process control table.

FIGS. 7A and 7B are diagrams each illustrating an example of a workflow edit screen.

FIGS. 7C and 7D are diagrams each illustrating an example of a workflow edit screen.

FIG. 7E is a diagram illustrating an example of a workflow edit screen.

FIGS. 9C and 9D are diagrams each illustrating an example of a workflow process setting screen.

FIG. 10 is a diagram illustrating an example of a product type/part correspondence table.

FIG. 12 is diagram illustrating an example of a workflow information table.

FIGS. 13A and 13B are diagrams illustrating an example of cover information and an example of a body information table.

FIGS. 13C and 13D are diagrams illustrating an example of front page information and an example of a wraparound band information table.

DESCRIPTION OF THE EMBODIMENTS

Embodiments of the present invention are described below with reference to drawings.

First Embodiment

Figure 1:
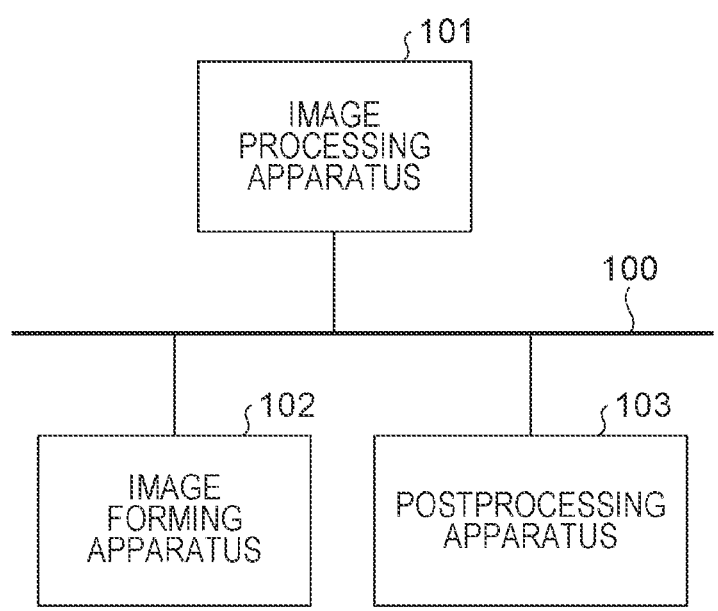
FIG. 1 illustrates a system configuration.

FIG. 1 is a diagram illustrating a configuration of a system according to an embodiment of the present invention. In the present embodiment, the system includes an information processing apparatus 101, an image forming apparatus 102, and a post-processing apparatus 103. The information processing apparatus 101, the image forming apparatus 102, and the post-processing apparatus 103 are connected to one another via a network 100. The image forming apparatus 102 analyzes print data transmitted from the information processing apparatus 101 or the like, converts each page into a dot image, and prints the dot image. A printed matter output from the image forming apparatus 102 is delivered to the post-processing apparatus 103 by hand carry by an operator, or delivered to the post-processing apparatus 103 via a belt conveyor (not shown). The post-processing apparatus 103 is capable of communicating with the image forming apparatus 102 or the image processing apparatus 101 via the network 100. The post-processing apparatus 103 performs processing such as cutting, creasing, folding, bookbinding, and perfect binding on the delivered printed matter. It is also possible to perform bookbinding first and then cutting using a plurality of post-processing apparatuses. Although one information processing apparatus 101, one image forming apparatus 102, and one post-processing apparatus 103 are illustrated in FIG. 1, any number of apparatuses may be disposed. For example, printed matters may be output by a plurality of image forming apparatuses, and the printed matters may be processed by a plurality of post-processing apparatuses 103.

Figure 2A:
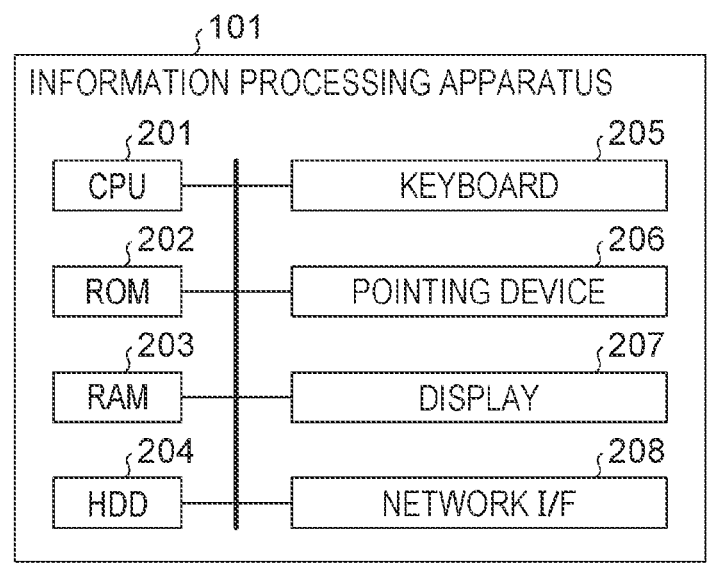
FIGS. 2A and 2B are diagrams illustrating a hardware configuration and a software configuration of an information processing apparatus.

FIG. 2A illustrates a hardware configuration of the information processing apparatus 101. A CPU 201 reads out a control program stored in a ROM 202 and executes various control processes. A RAM 203 is used by the CPU 201 as a temporary storage area such as a main memory and a work area. An HDD 204 stores image data and various programs. A keyboard 205 is an input device functioning as an instruction input unit, and is used to input a control command, text data, or the like into an application which will be described later. A pointing device 206 is an input device functioning as an instruction input unit as well as the keyboard 205, and is used to give a control command to an application which will be described later. A display 207 is an output apparatus functioning as a device unit. The display 207 displays a command input via the keyboard 205 or the pointing device 206, and displays an application according to the present invention. A network I/F 208 connects the information processing apparatus 101 to a network (Local Area Network, the Internet, or the like). The information processing apparatus 101 transmits/receives various information to/from another apparatus on the network using the network I/F 208.

Figure 2B:
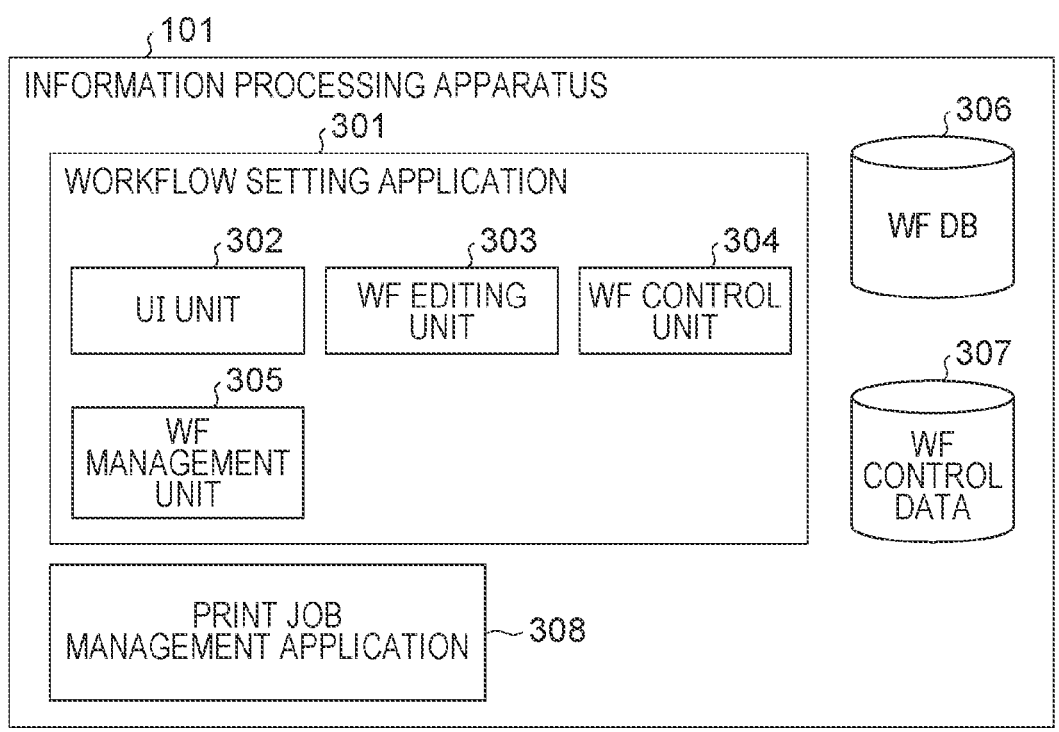

FIG. 2B is a diagram illustrating a software configuration of the information processing apparatus 101. A workflow setting application 301 is a program module which is installed in the information processing apparatus 101 and is executed. More specifically, the workflow setting application 301 is loaded in a RAM 203 and executed by the CPU 201. A UI unit 302 builds a graphical user interface (GUI) described later, and accepts various input operations performed by a user and issues an instruction to execute a corresponding process. The workflow editing unit 303 executes various editing processes (creation, editing, and registration of the workflow) of the workflow setting application. The workflow control unit 304 accesses the workflow control data described later, and executes various controls in editing the workflow. The workflow management unit 305 accesses a workflow database (DB) described later, and performs registration of a workflow created by the workflow setting application or referring to information on an already registered workflow. A workflow DB 306 is a database for managing workflow information described later. The workflow DB is not limited to a configuration in which information is stored in the HDD 204 of the information processing apparatus 101, but information may be stored in another information processing apparatus (such as a database server) connected via a network. Workflow control data 307 is control data used in creating a workflow described later. A print job management application 308 is a program module which is installed in the information processing apparatus 101 and which operates on the information processing apparatus 101. The print job management application receives an order for print production from a user via an order system (not shown), acquires, from the workflow DB, workflow information registered by the workflow setting application, and generates a print job corresponding to the order. The print job management application transmits the generated print job to the predetermined image forming apparatus 102 and the post-processing apparatus 103. Note that the print job management application and the workflow setting application may be integrated in one application. In an alternative implementation, the print job management application and the workflow setting application may be installed in different information processing apparatuses 101.

Figure 4A:
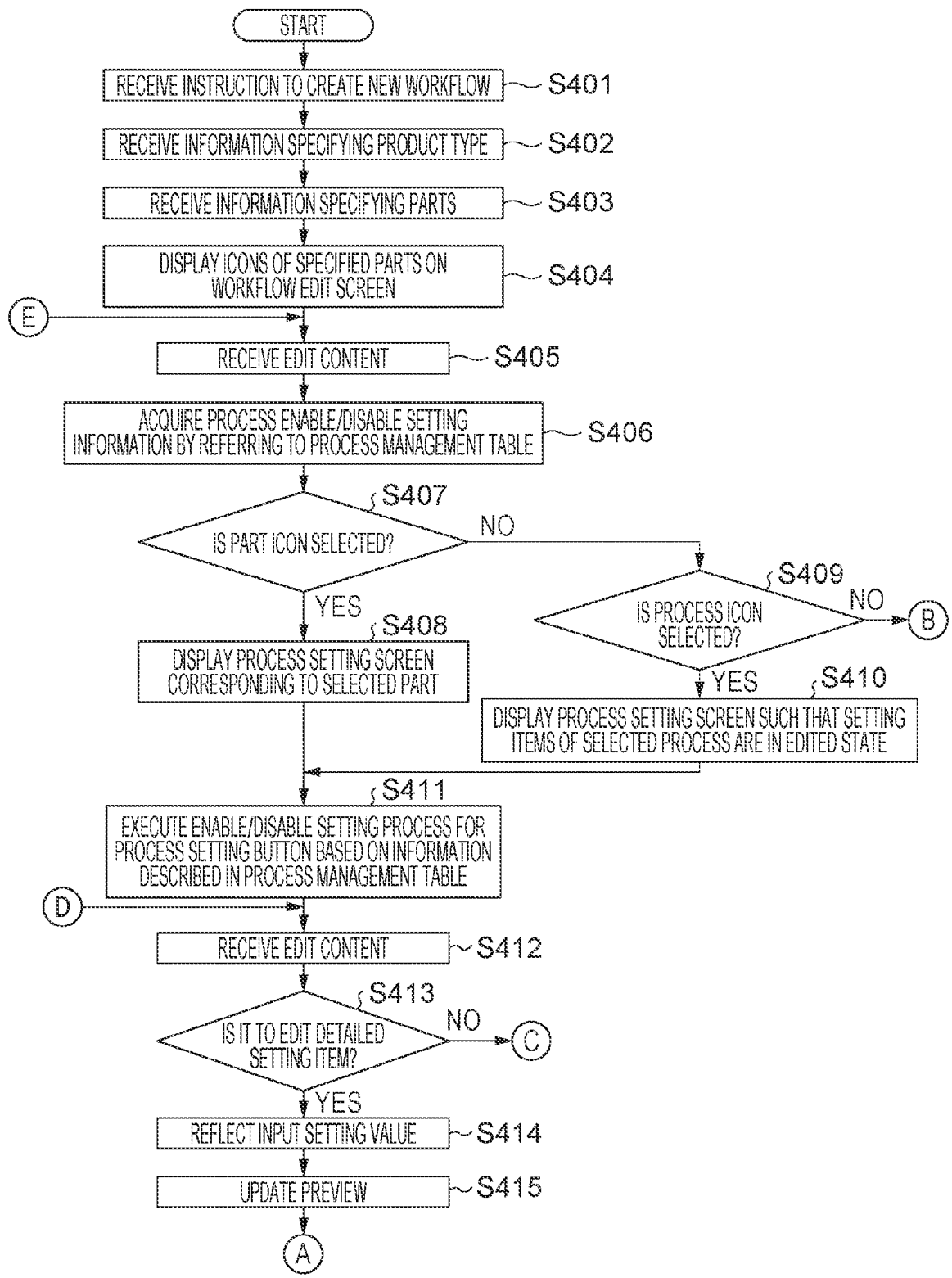
FIGS. 4A and 4B are flow charts illustrating a workflow creation process.
Figure 4B:
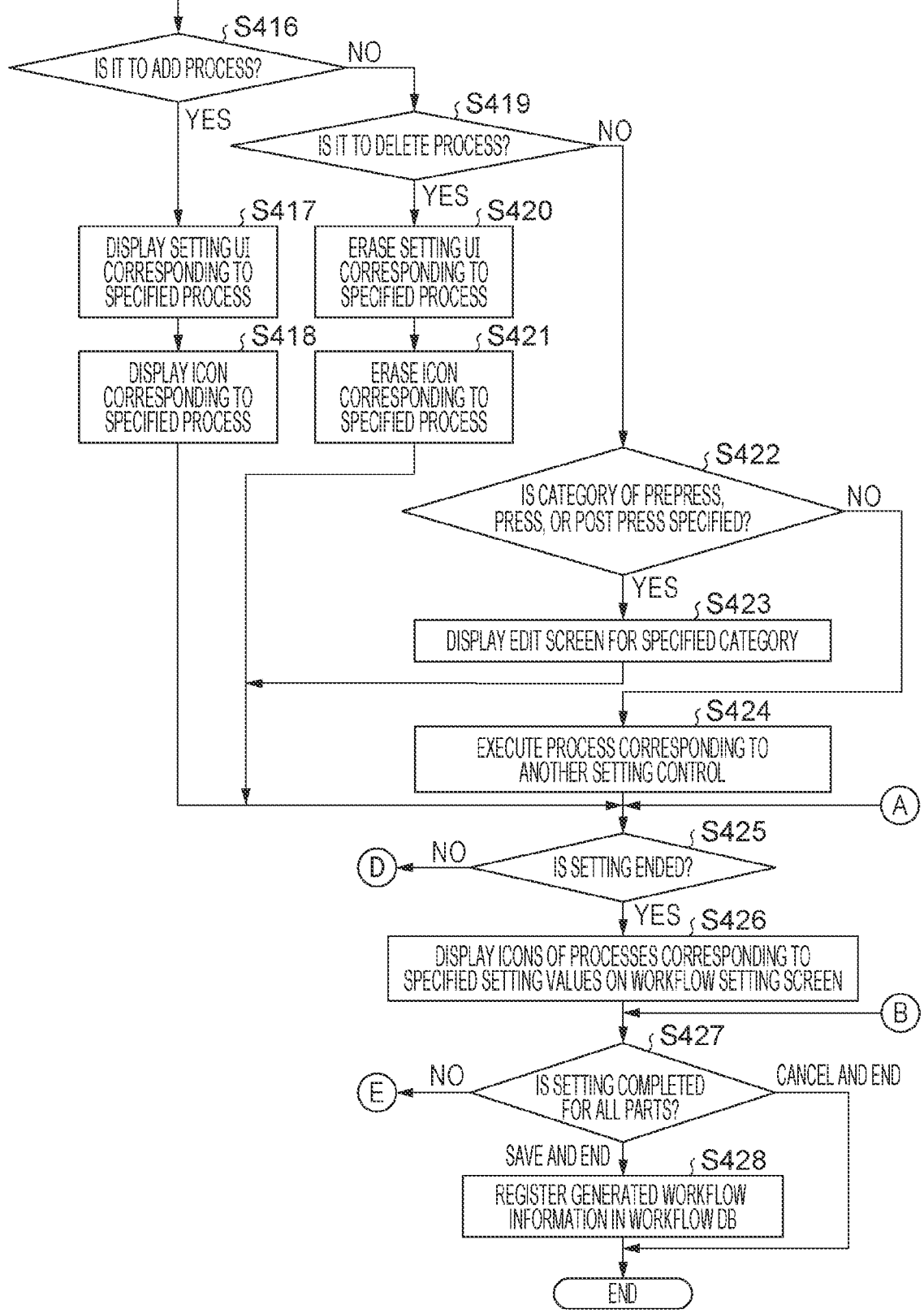

FIGS. 4A and 4B are flow charts illustrating a workflow setting process and a registration process performed by the workflow setting application.

Figure 3A:
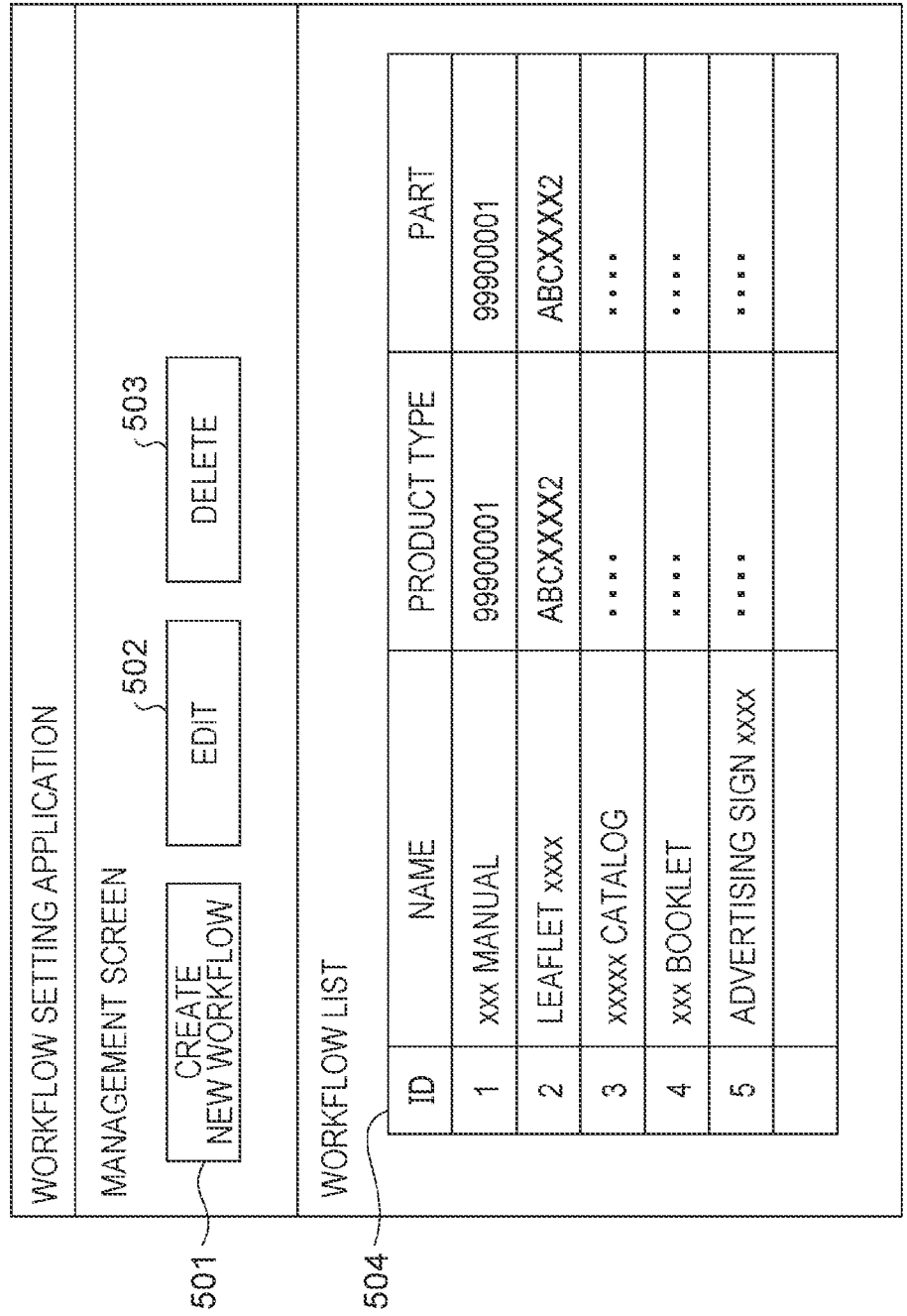

In a processing step S401, the workflow setting application receives an operation of a new workflow creation process and displays a new workflow creation screen. FIG. 3A illustrates an example of a workflow management screen of the workflow setting application. When a user instructs execution of an execution file of the workflow setting application, the workflow setting application is loaded in the RAM 203, and the UI unit 302 displays a workflow management screen on the display 207. The workflow management screen includes a new workflow creation button 501, an edit button 502, a delete button 503, and a workflow list 504. In the workflow list 504, a list of workflow information registered in the workflow DB is displayed. When the UI unit 302 detects that a user presses the new workflow creation button 501 using the keyboard 205 or the pointing device 206, the UI unit 302 notifies the workflow editing unit 303 that a new workflow creation command is issued. In response, the workflow editing unit 303 displays a new workflow creation screen on the display 207 via the UI unit 302.

In a processing step S402, the workflow setting application receives specifying of a product type via the new workflow creation screen. FIG. 3B illustrates an example of a new workflow creation screen provided by the workflow setting application. The new workflow creation screen has controls for setting a name 601, a product type 602, and a part 603, and includes an OK button 604 for executing creation of a new workflow with the set content, and also includes a cancel button 605 for canceling. The name 601 is a text box for setting an arbitrary name for identifying a workflow to be created. The product type 602 is a list box for setting a product type from product types predefined by the workflow setting application. For example, types of products such as books, manuals, and business cards are listed. The part 603 is a list box for setting parts that constitute a product. Details thereof will be described later. When the UI unit 302 detects that a user has specified a product type 602 via the keyboard 205 or the pointing device 206, the UI unit 302 sets the specified product type. The processing flow then proceeds to a next step.

In a processing step S403, the workflow setting application receives specifying of a part on the new workflow creation screen. The part 603 is a list box for setting parts such as a cover, a body, a front page, and a wraparound band constituting the product. It is allowed to set a plurality of parts depending on the product to be produced. In an example shown in FIG. 3B, four parts, that is, the cover, the body, the front page, and the wraparound band are set. When the UI unit 302 detects that the part 603 is specified by a user via the keyboard 205 or the pointing device 206, the specified part is set. When it is detected that the OK button 604 on the new workflow creation screen is pressed, the processing flow proceeds to a next step.

In a processing step S404, icon images corresponding to the parts set in S403 are displayed on the workflow edit screen. FIG. 7A illustrates an example of a workflow edit screen. The workflow editing screen includes a save button 701 for saving the edited workflow in the workflow DB 306, and a cancel button 702 for canceling editing of the workflow. A workflow area 703 is an area in which an edited workflow is displayed. More specifically, part icons 704 indicating respective set parts and serially-connected process icons 705 indicating the workflow for each part. In FIG. 7A, the process icons 705 denoted by "Imp", "Bar", "ReM", "PRN", "Bind", "Cut", and "C&C" respectively represent imposition, barcode, register marks, printing, binding, cutting, and cut and crease. In this step S404, icon images corresponding to the parts set in S403 are displayed in the workflow area 703 via the UI unit 302. For example, in a case where the cover, the body, the front page, and the wraparound band are set as parts, four icon images corresponding to the respective parts are displayed. FIG. 7B illustrates a workflow edit screen in a state where a workflow is newly created on the new workflow creation screen. At a point of time when the new workflow is just created, only the icons (the cover 706, the body 707, the front page 708, the wraparound band 709) representing the respective parts are displayed.

In a processing step S405, an editing operation on the workflow edit screen is received. The UI unit 302 receives various editing operations when a user clicks, via the pointing device 206, an editing control such as one of the part icon 704, the process icon 705, the save button 701, the cancel button 702, or the like.

In a processing step S406, information about a settable process depending on a part is acquired. FIG. 5A illustrates an example of a process management table for managing a process settable for each part. In the cover and body parts, it is managed whether each process, such as imposition, barcode, folding, saddle stitching, or the like is settable. The workflow editing unit 303 obtains a process management table via the workflow control unit 304. The workflow control unit 304 temporarily stores, in the RAM 203, information indicating the acquired parts and whether the process setting is enabled/disabling.

In a processing step S407, it is determined whether the editing operation received in S405 is a process of selecting a part icon. In a case where the UI unit 302 detects that one of part icons 704 has been clicked by a user using the pointing device 206, it is determined that a part icon selection process is performed, and the processing flow proceeds to S408. In the other case, the processing flow proceeds to S409.

Figure 9A:
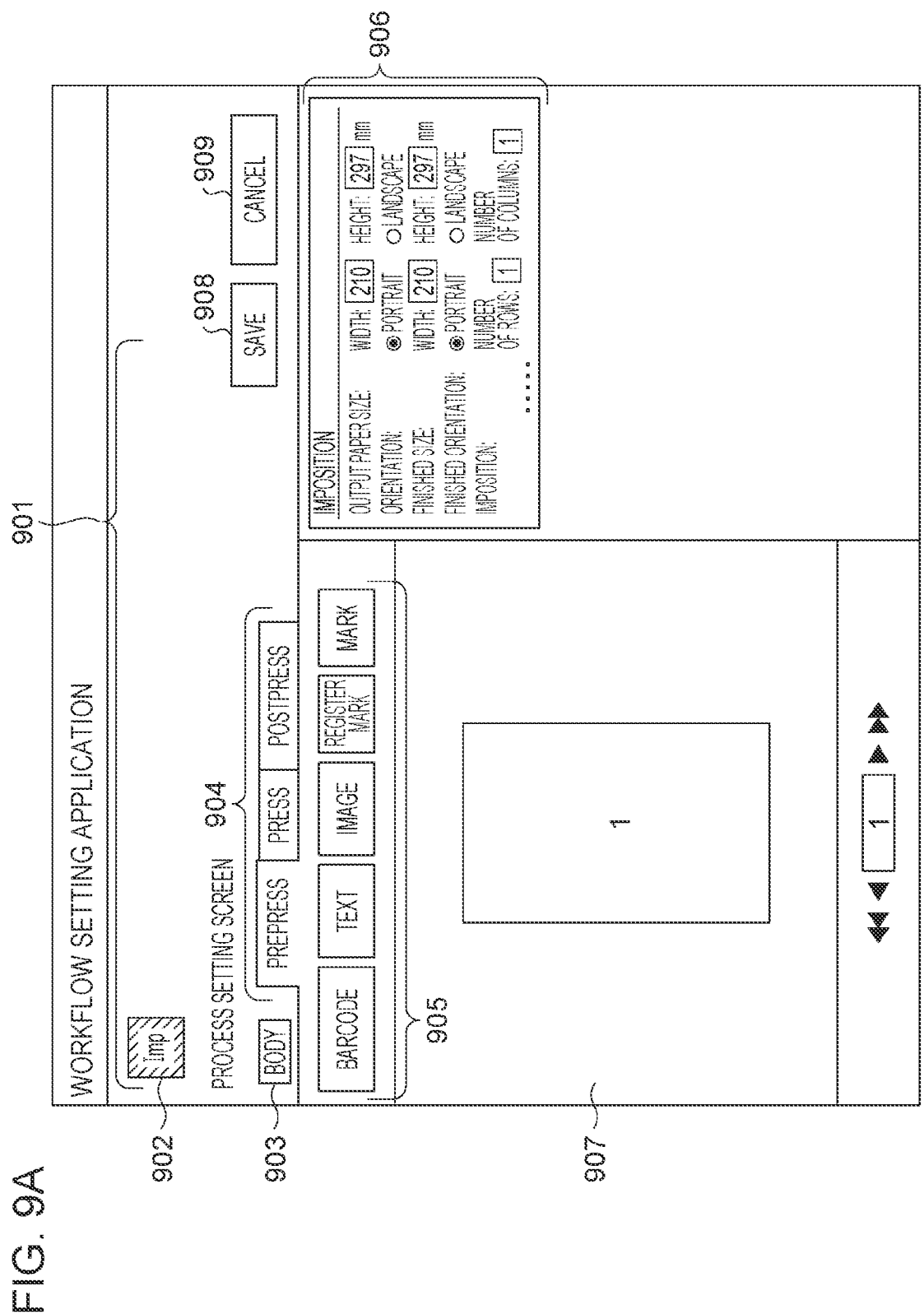
FIGS. 9A and 9B are diagrams each illustrating an example of a workflow process setting screen.

In a processing step S408, a workflow process setting screen corresponding to the part selected in S405 is displayed. FIG. 9A illustrates an example of a workflow process setting screen. Reference numeral 901 denotes a process icon representing a workflow set for a part to be set. Reference numeral 902 denotes an icon indicating that the imposition process has been set. Reference numeral 903 denotes a label control indicating a part to be set. Reference numeral 904 denotes a tab control for setting a process of a category of a prepress, a press, or a postpress. For example, when a prepress tab is selected, various setting controls for setting a process of the prepress category are displayed. Reference numeral 905 denotes process setting buttons for setting various processes. In the case where the prepress tab is selected, process setting buttons for setting a barcode, text, an image, a register mark, a mark that can be set in the prepress category are displayed. Reference numeral 906 denotes a detail setting control for setting a detailed setting of each process. Reference numeral 906 denotes a detailed setting control for setting an imposition process. For example, controls for setting an output paper size, a finished size, and the like are displayed. Reference numeral 907 denotes a preview area in which an image of a printed matter is displayed in a state in which settings made by respective setting controls are reflected. Reference numerals 908 and 909 respectively denote a save button and a cancel button for saving or discarding a content set on the workflow process setting screen and returning to the workflow edit screen. FIG. 5B illustrates a workflow process control table stored in workflow control data 307. The workflow process control table indicates which process is assigned to which category, and further defines whether or not each process is required and whether multiple setting is allowed or not. Note that a process icon is assigned to each of the processes defined in the workflow process control table. For example, there are six processes in the prepress category, that is, imposition, barcode, text, image, register marks, and mark, and imposition process is defined as an essential process that is required to be set, and the other processes are optional processes. It is also defined that the imposition process is allowed to be set only once, and the other processes are allowed to be set multiple times. Only the printing process exists in the press category, and there are five processes in the postpress category, that is, folding, cut and crease, saddle stitching, perfect binding, and three-side cutting. The order of performing processes in each of prepress and postpress is also defined. In the example shown in FIG. 5B, the prepress has order information indicating the order of imposition, barcode, text, register marks, and mark. Thus, in generating a workflow, processes are added in the above-described defined order. In the postpress, saddle stitching and perfect binding have the same order information. When saddle stitching is selected, selecting of perfect binding is disabled. When perfect binding is selected, selecting of saddle stitching is disabled. When processes in the postpress are not performed in the determined correct order, a correct product is not obtained. However, in the prepress, the same product can be obtained even if the processing order is not equal to the determined order except for the imposition. Therefore, the order information may be defined such that the imposition is at the first position in the order but the other processes may not be defined and may be performed in the order in which the processes are selected by the workflow setting application.

In S408, the workflow process setting screen corresponding to the part selected in S405 is displayed on the display 207 via the UI unit 302. For example, when a "cover" part is selected, a workflow process setting screen for setting a process associated with "cover" is displayed. Furthermore, the workflow control unit 304 accesses the workflow process control table in the workflow control data 307. The workflow process setting screen is displayed such that setting controls 906 are displayed such that a default value is set for the imposition process that is an essential process and the process icon 902 indicating the imposition process is displayed in 901. The applied setting values are temporarily stored in the RAM 203. Although in the example described above, it is assumed by way of example that the imposition process is an essential item, workflows may be set without setting the imposition process, and an original imposition setting employed in electronic data given together with an order may be directly used.

In a processing step S409, it is determined whether the editing operation received in S405 is a process of selecting a process icon. In a case where the UI unit 302 detects that one of process icons 705 has been clicked by a user using the pointing device 206, it is determined that a process icon selection process is performed, and the processing flow proceeds to S410. In the other case, the processing flow proceeds to S426.

In a processing step S410, a workflow process setting screen corresponding to the process selected in S405 is displayed. In this processing step, when not a part but a process is selected, the workflow process setting screen is displayed such that the selected process is in an editing mode. For example, in a case where an icon of the imposition process for the body part is selected, a workflow process setting screen for editing the body part is displayed such that a control of setting the imposition process of a prepress tab is focused. As a result of this, when a plurality of processes have already been selected in the workflow being edited, it is possible to open the workflow setting screen for editing the selected process directly from the workflow edit screen.

Figure 11:
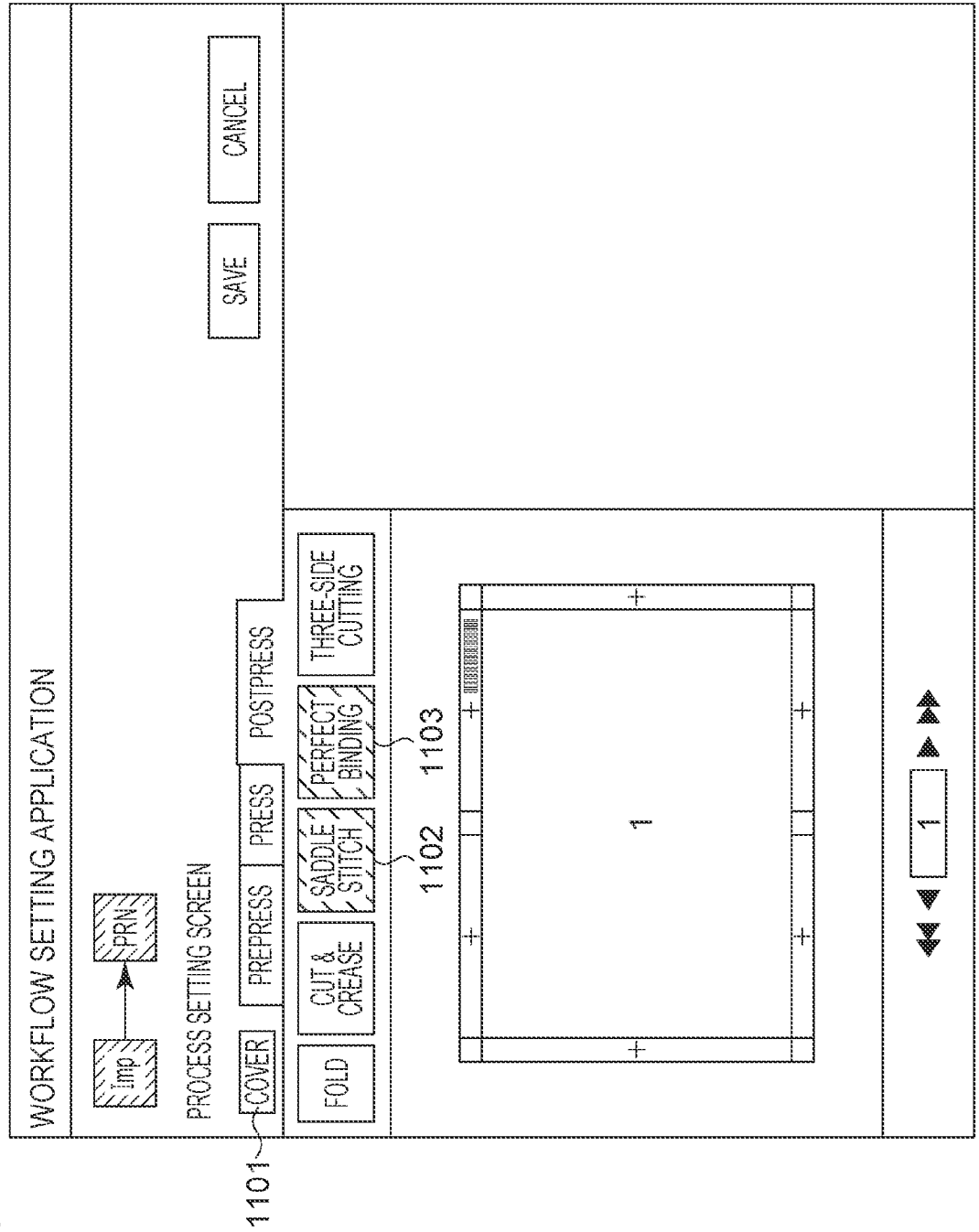
FIG. 11 is a diagram illustrating an example of a workflow process setting screen for setting a cover part.

In step S411, using the part and process setting enable/disable information acquired in step S406, the enable/disable control is performed on the buttons 905 for setting the process on the workflow process setting screen. The workflow editing unit 303 displays, via the UI unit 302, a button corresponding to a setting disabled process in a manner indicating that the button is disabled. In the process management table shown in FIG. 5A, it is registered that the process of the saddle stitching and the perfect binding for the postpress of the cover are disabled. Therefore, in the case of the workflow process setting screen is that for editing the cover part, the process setting buttons respectively for setting the saddle stitching and the perfect binding are displayed so as to indicate that these buttons are disabled, and controls are performed such that setting thereof is disabled. FIG. 11 illustrates an example of the workflow process setting screen for setting the cover part. Reference numeral 1101 denotes a label indicating that the cover part is being edited. A button 1102 for setting saddle stitching and a button 1103 for setting perfect binding indicate that these are disabled. In a process, such as saddle stitching or perfect binding, two or more parts are combined in the process, if setting is enabled for all parts, duplicate settings may be performed among a plurality of parts. To handle this situation, setting is enabled for only a main part (for example, the body). In the present embodiment, by way of example, the enabled/disabled state for each part is fixed. However, a setting value indicating that setting is enabled for only one of parts may be registered in the process management table, and if saddle stitching is specified for the cover part, then saddle stitching is disabled for the body part. If the setting of the saddle stitching is cancelled for the cover part, then saddle stitching may be enabled for the body part. Note that the manner of indicating the disabled state is not limited to displaying a button in a disabled-state indication mode, but another manner may be employed. For example, the button may be hidden.

In a processing step S412, various editing via the workflow process setting screen are received. The UI unit 302 receives various editing operations when the user selects or clicks, using the pointing device 206, one of the following edit controls or buttons: A tab control 904; a process setting button 905; a process delete button 915 described later; a detail setting control 906; a save button 908; a cancel button 909; and the like.

In a processing step S413, it is determined whether the received editing operation is editing of a detail setting item. Upon receiving a notification from the UI unit 302 that the detail setting control 906 has been edited (by inputting a setting value, selecting an option in a list box, etc.), the workflow editing unit 303 determines that editing of a detail setting item is performed, and the processing flow proceeds to S414. In the other case, the processing flow proceeds to S416.

In S414, the workflow editing unit 303 generates a process setting value based on the edited content received in S413. Information on the generated setting value is temporarily stored in the RAM 203 and is reflected in the detail setting control 906 on the workflow process setting screen via the UI unit 302.

Figure 9B:
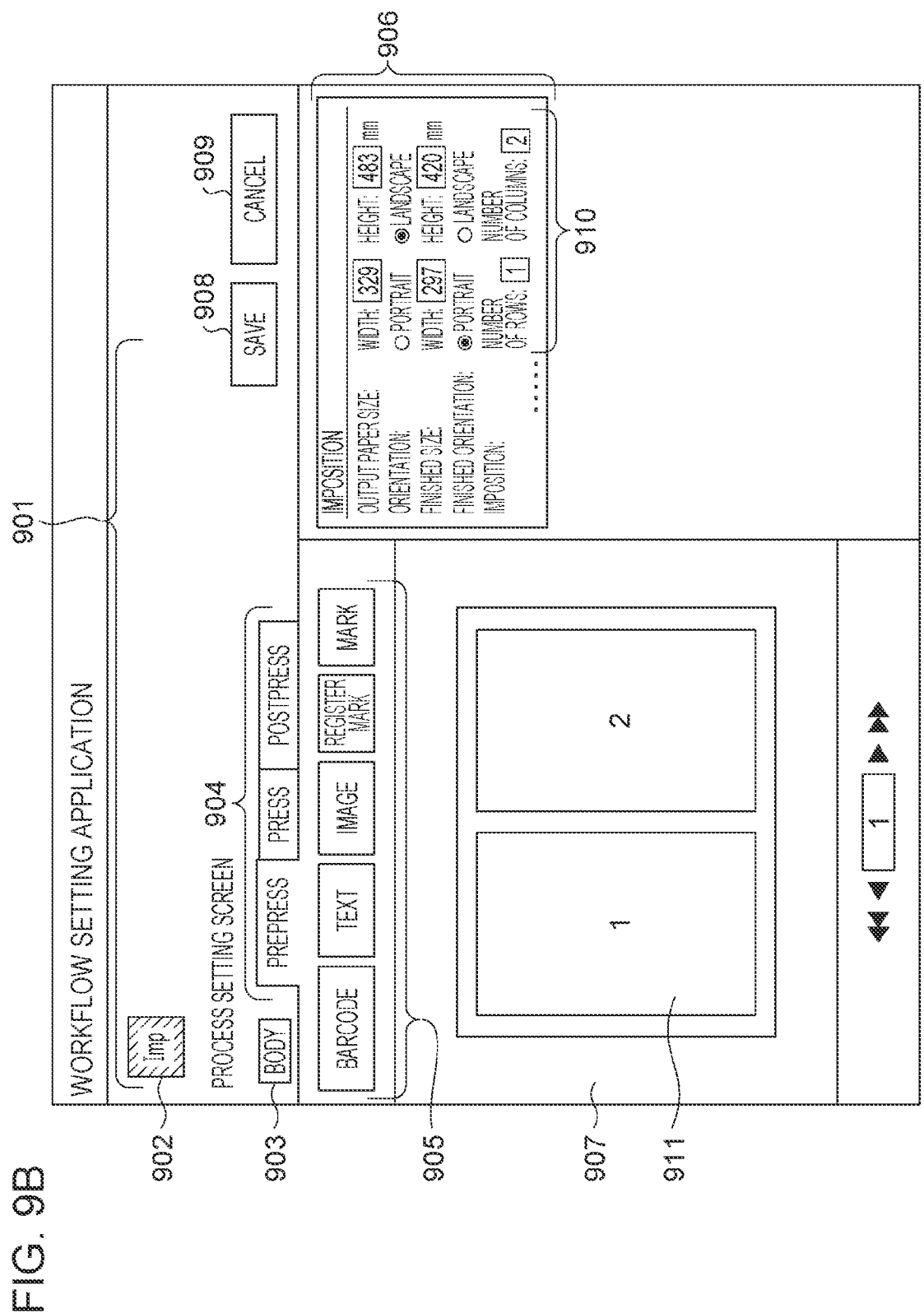

In a processing step S415, an image of a printed matter displayed in the preview area 907 is updated according to the setting. FIG. 9B illustrates an example of a workflow process setting screen updated as a result of editing detail setting items of the process and updating the preview. When detail setting items of the imposition process (output paper size, orientation, finished size, finished orientation, imposition) 910 are edited, the image 911 of the printed matter displayed in the preview area 907 is updated according to the setting content.

In a processing step S416, it is determined whether the received editing operation is adding of a process. Upon receiving a notification from the UI unit 302 that one of the process setting buttons 905 is pressed (in response to receiving an instruction to add a process), the workflow editing unit 303 determines that the received editing operation is adding of a process, and the processing flow proceeds to S417. In the other case, the processing flow proceeds to S419.

In a processing step S417, the UI unit 302 displays, on the workflow process setting screen, a detail setting control corresponding to the added process received in step S416. As for each set value of the displayed detail setting control, a default value is set. The default value may be a fixed value held in a program, or a previous set value may be stored and used. The preview area 907 is updated as necessary according to the added process and the set default value.

In S418, the UI unit 302 displays a process icon corresponding to the added process received in step S416 on the workflow process setting screen. FIG. 9C illustrates an example of a workflow process setting screen updated from the state shown in FIG. 9B such that a barcode process of the prepress category is added. If it is detected in S416 that the barcode process setting button 912 is pressed, the processing flow proceeds to S417. In S417, a detail setting control 913 corresponding to the barcode is displayed and furthermore a barcode 914 corresponding to the setting value is displayed in the preview area 907. In S418, a process icon 915 corresponding to the barcode is displayed. The process icon 915 indicating the barcode is displayed at a position following a position of the process icon 902 of the already set imposition such that the process icon 915 and the process icon 902 are connected via an arrow. The order of processes is determined based on the order information shown in FIG. 5B. In the case shown in FIG. 5B, the order information indicates that the imposition is at a first position and the barcode is at a following position, and thus a workflow is described such that the barcode is processed after the imposition. Note that reference numeral 916 denotes a delete button for deleting a process described later. Note that the delete button 916 is displayed in the detail setting control when the process is defined as a not essential process in FIG. 5B.

In a processing step S419, it is determined whether the received editing operation is deleting of a process. Upon receiving a notification from the UI unit 302 that the process delete button (916 in FIG. 9C) is pressed, the workflow editing unit 303 determines that the received editing operation is deleting of a process, and the processing flow proceeds to S420. In the other case, the processing flow proceeds to S422. In FIG. 9C, 916 denotes a delete button for deleting a barcode process. A delete button is disposed in a detail setting control for a process which is defined as not an essential process in the workflow process control table shown in FIG. 5B such that when this delete button is pressed, an instruction to execute deleting of the process is issued.

In S420, a detail setting control corresponding to the process specified, by the UI unit 302 in S419, to be deleted is hidden on the workflow process setting screen, and the set value is deleted from the RAM 203. Furthermore, the preview area 907 is updated as needed in accordance with the deleting of the process.

In step S421, a process icon corresponding to the process instructed, by the UI unit 302 in S419, to be deleted is hidden on the workflow process setting screen. In FIG. 9C, when the delete button 916 for the barcode process is pressed, a detail setting control 913 corresponding to the barcode process, the barcode 914 in the preview area, and the process icon 915 corresponding to the barcode process are hidden. As a result, a state shown in FIG. 9B is obtained.

In processing step S422, it is determined whether the received editing operation is specifying of one of categories: prepress; press; and postpress. Upon receiving a notification from the UI unit 302 that a tab control corresponding to one of prepress, press, and postpress is pressed, the workflow editing unit 303 determines that one of the categories prepress, press, and postpress is specified, and the processing flow proceeds to step S423. In the other case, the processing flow proceeds to S424.

In S423, the UI unit 302 displays an edit screen corresponding to the category received in step S422.

In a processing step S424, in a case where the received editing operation is not any one of the detail setting process (S413), adding of a process (S416), deleting of a process (S419), and specifying of a category (S422), a process corresponding to the received editing operation is performed. In this processing step, a general UI operation, such as changing the magnification (not shown) of the preview image in the preview area 907, scrolling (not shown) of a detail setting control laid out outside the screen, or the like is performed.

In S425, it is determined whether the workflow process setting corresponding to the part is completed. Upon receiving a notification via the UI unit 302 that the save button 908 or the cancel button 909 is pressed by a user, the workflow editing unit 303 determines that the workflow process setting has been completed. In a case where it is determined that the process is completed, the processing flow proceeds to S426. However, in a case where another editing operation is received and setting of the workflow process is further continued, the processing flow proceeds to S412. When a user has set processes of the prepress, the press, and the postpress for the part, and has input all necessary setting values, the user presses the save button 908 to end the setting. When the save button 908 is pressed, each set value on the workflow process setting screen as of the present time is finalized, and the processing flow proceeds to a next step. On the other hand, in a case where the cancel button 909 is pressed, the content of setting made in steps from S412 to S424 are discarded, and the processing flow proceeds to a next step. When it is determined that the process is ended, the UI unit 302 closes the workflow process setting screen and opens the workflow edit screen.

Figure 9D:
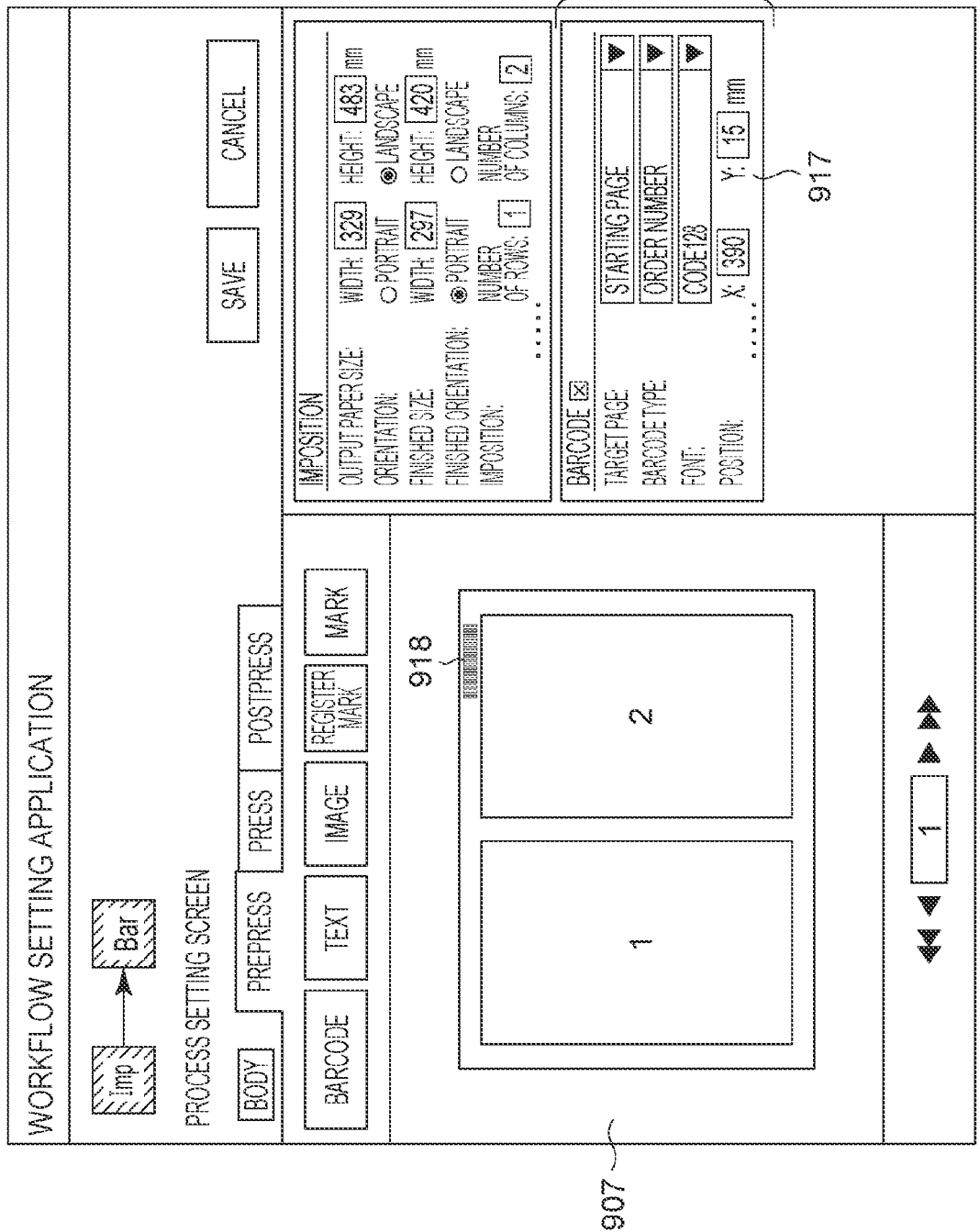
Figure 9E:
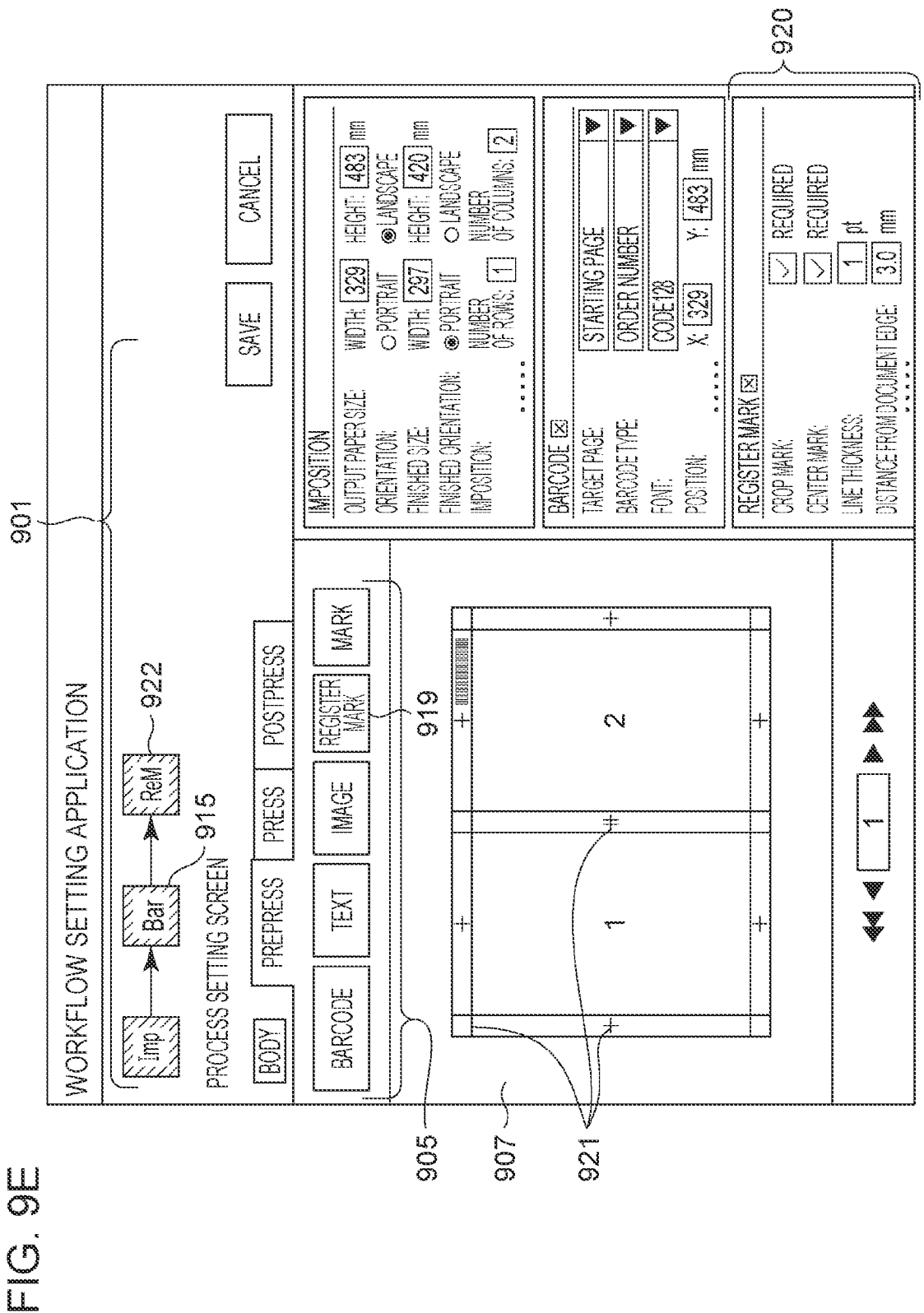
FIGS. 9E and 9F are diagrams each illustrating an example of a workflow process setting screen.
Figure 9F:
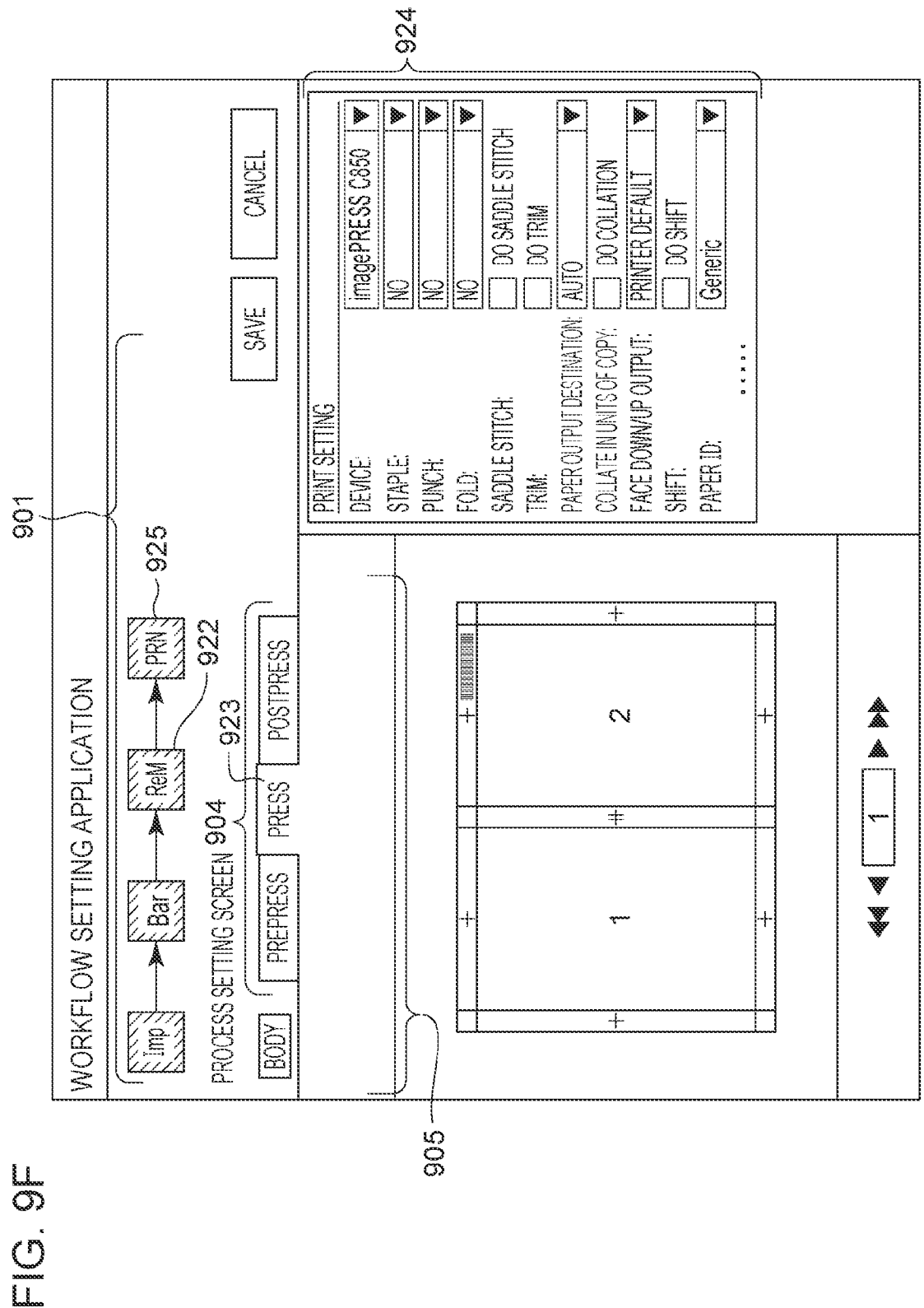
Figure 9G:
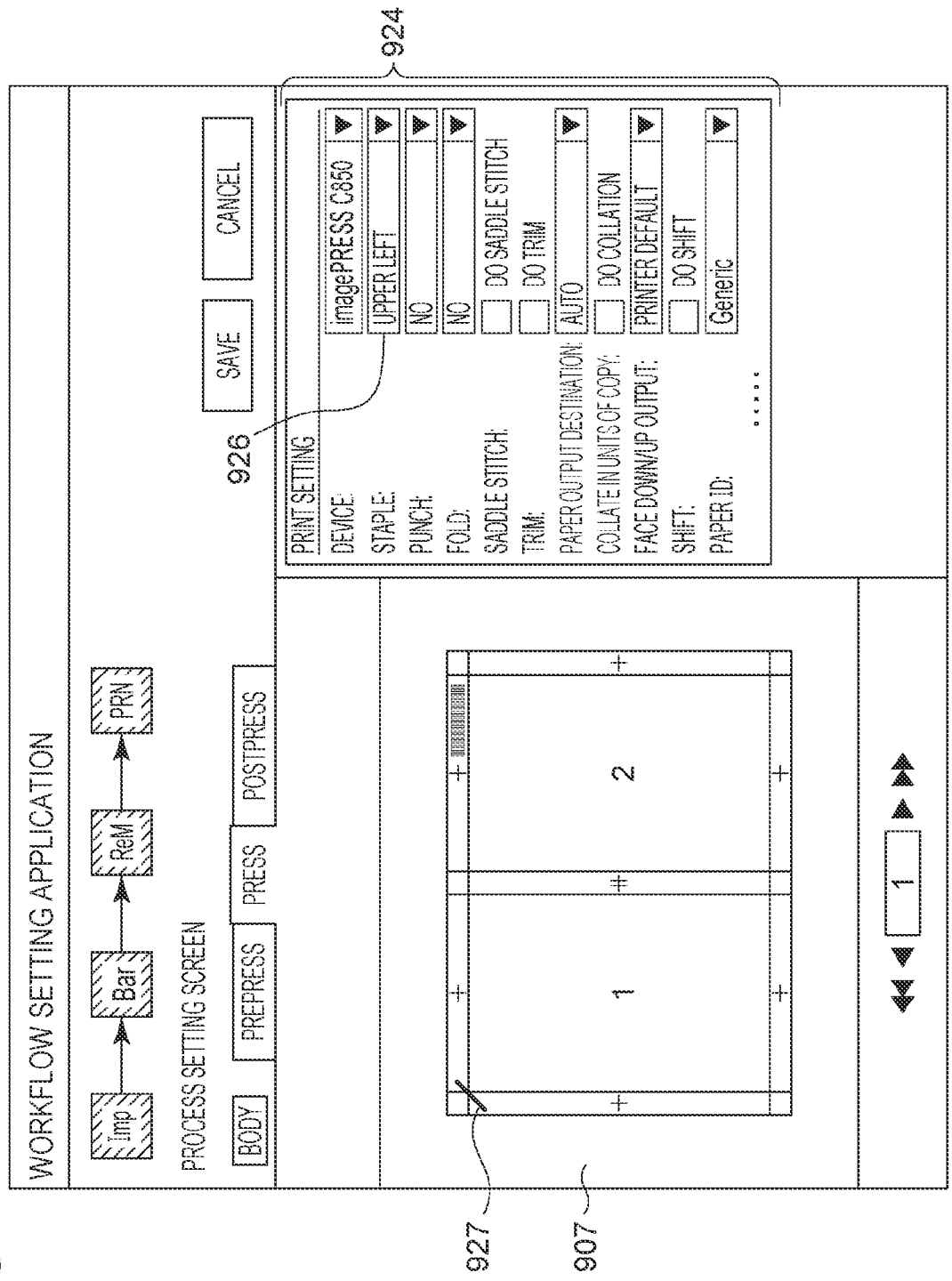
FIGS. 9G and 9H are diagrams each illustrating an example of a workflow process setting screen.
Figure 9H:
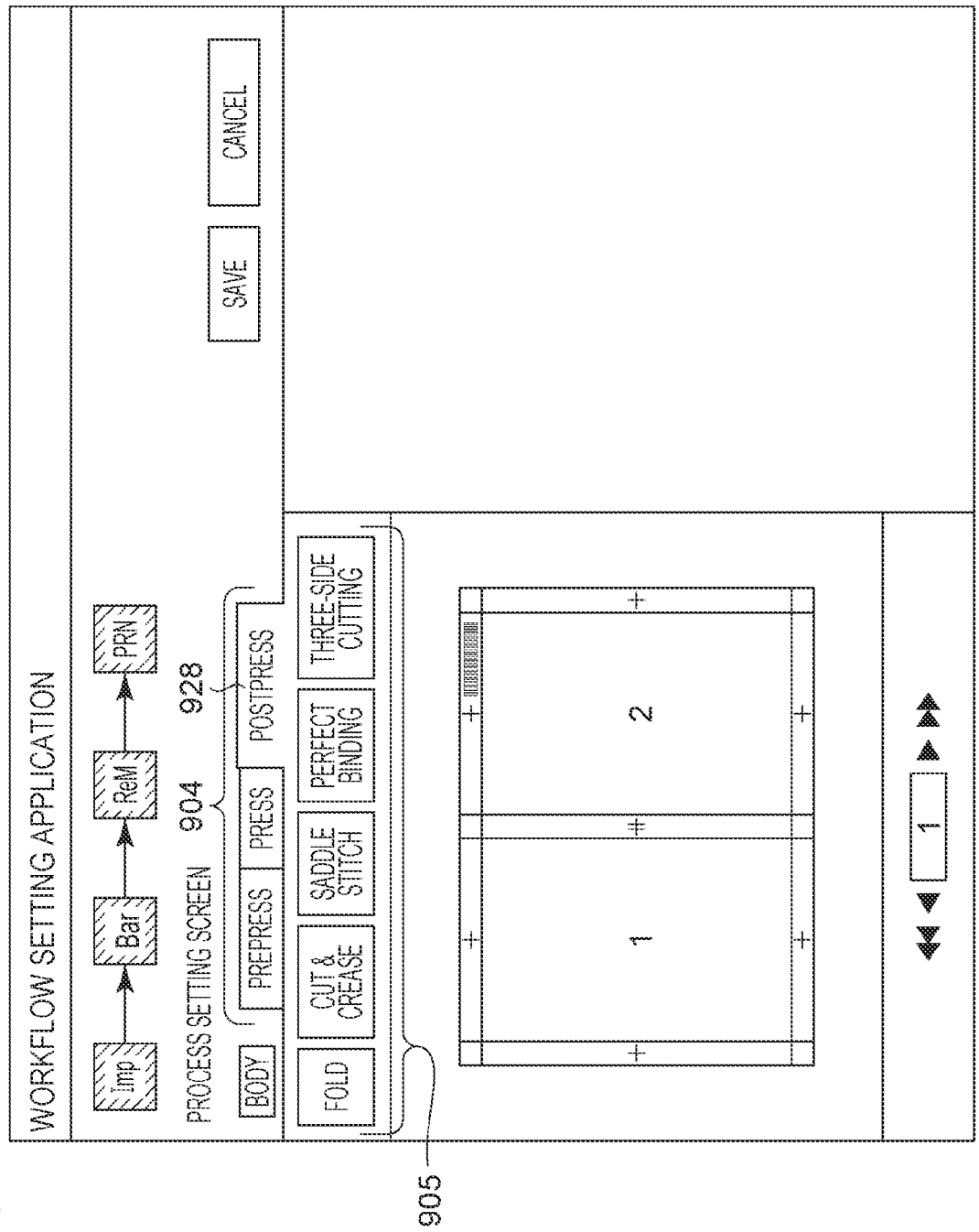
Figure 9I:
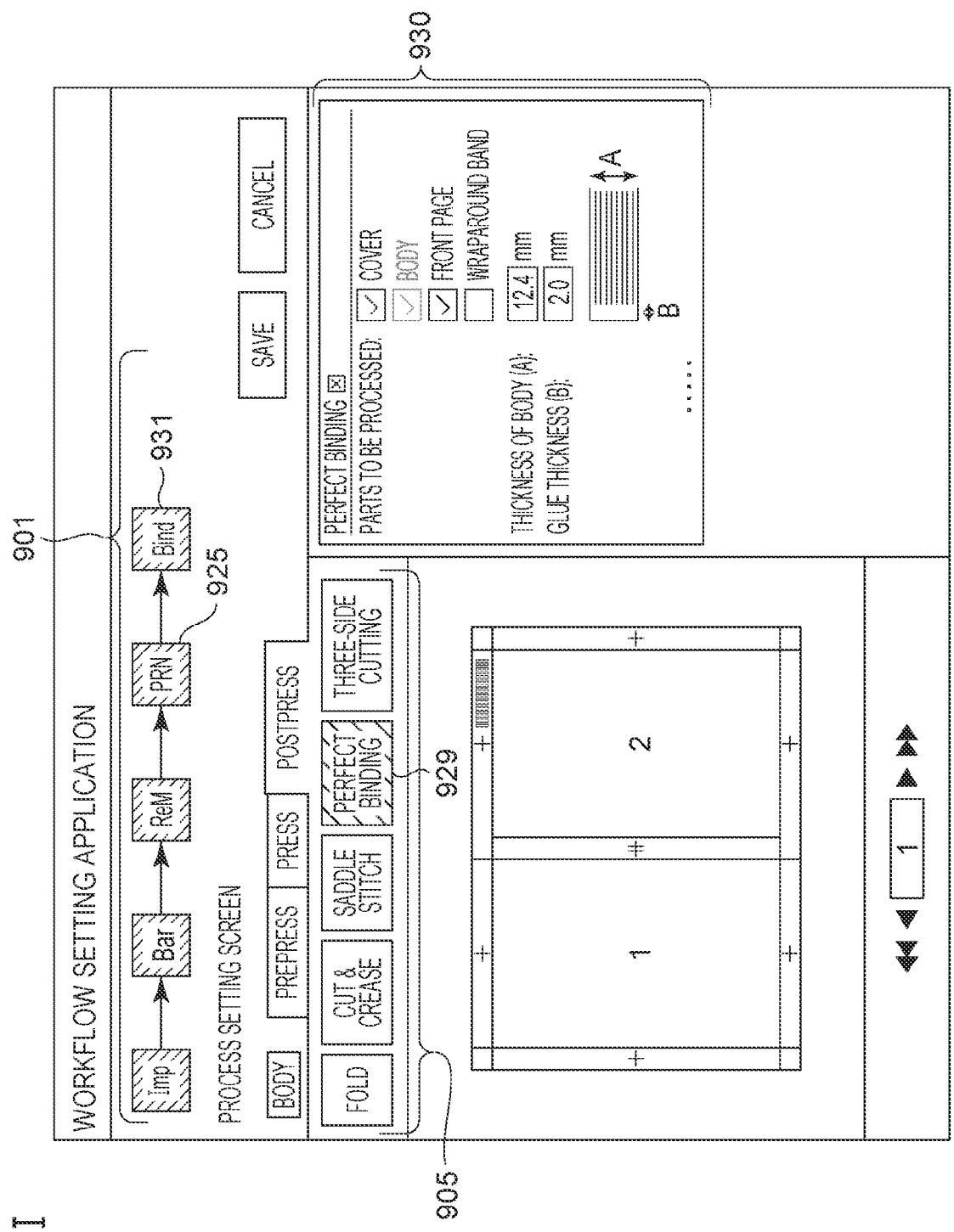
FIGS. 9I and 9J are diagrams each illustrating an example of a workflow process setting screen.
Figure 9J:
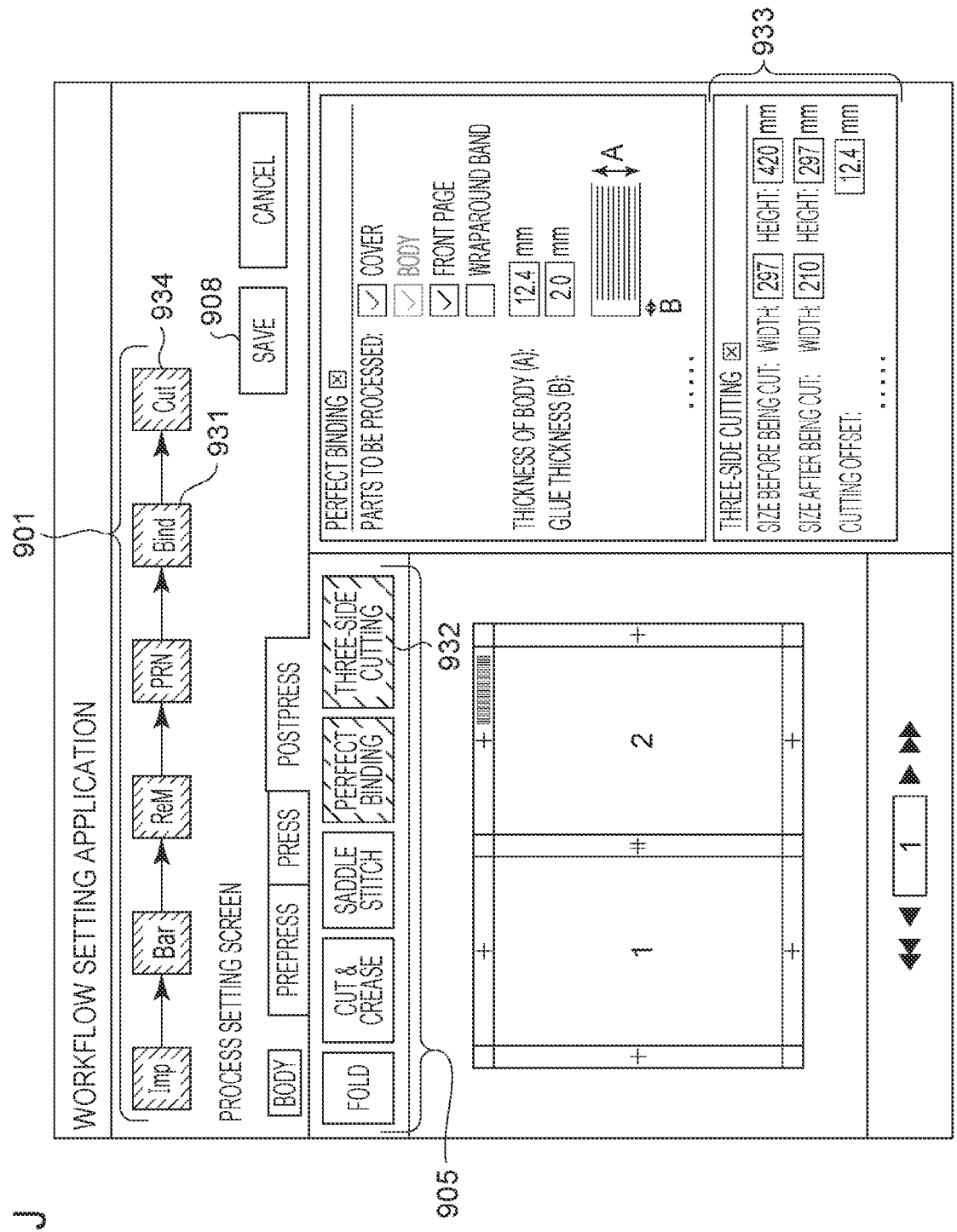

By repeatedly executing processing steps from S412 to S424 in accordance with an instruction issued by a user in the above described manner, the setting of the workflow in for each part is performed. When editing of various processes and setting of a workflow for a body part are performed starting from the state shown FIG. 9C, a flow of editing and setting may be as described below with reference to FIG. 9D to FIG. 9J. FIG. 9D shows a state in which the position of the barcode is edited so as to be moved from the position shown in FIG. 9C. When an arbitrary value is input in a setting control 917 for setting the position of the detail setting control 913 of the barcode process, the barcode 918 in the preview area 907 is displayed according to the input value. Alternatively, the position of the barcode may be edited by dragging and dropping the barcode 918 in the preview area 907 using the pointing device 206. FIG. 9E shows a state obtained as a result of adding a register mark process in the state shown in FIG. 9D. When the process button 919 for adding the register mark process is pressed, the detail setting control 920 for register marks is displayed, and specified register marks 921 is displayed in the preview area 907. A process icon 922 indicating the register mark process is displayed such that it is connected to the process icon 915 indicating the barcode process and such that the process icon 922 is located following the process icon 915. Thus, based on the order information shown in FIG. 5B, the workflow including the added registration mark process is obtained. FIG. 9F shows a press category setting screen obtained as a result of adding the press process in the state shown in FIG. 9E. When a tab control 923 for editing the press category is pressed, the setting screen is switched from the setting screen for the prepress category to the setting screen for editing the press category. In the press category, only the printing process, which is an essential process, is allowed to be set. Therefore, the process setting button 905 is not displayed, but a detail setting control 924 for setting the printing process is displayed by default. The process icon 925 indicating the printing process is displayed at a position following a position of the process icon indicating register mark process such that these process icons are connected. Note that the workflow may be set without setting the printing process in consideration of a case where printed sheets obtained outside the workflow are employed. In this case, a button (not shown) for instructing adding/deleting of the printing process is disposed on the setting screen. FIG. 9G shows a state obtained after a staple item is edited by a detail setting control 924 of the printing process added in FIG. 9F. An upper left position is set in the staple item 926, and an staple image 927 is displayed in the preview area 907 according to the setting. FIG. 9H shows a state obtained when in the state shown in FIG. 9G, the postpress category setting screen is displayed. When a tab control 928 for editing the postpress category is pressed, the setting screen is switched from the setting screen of the press category to the setting screen for editing the postpress category. In the postpress category, it is allowed to set processes of folding, cut and crease, saddle stitching, perfect binding, and three-side cutting. Thus, process buttons 905 for these respective processes are displayed. Any of the processes in the postpress category is not an essential process, and thus default setting is not given for any these processes. FIG. 9I shows a state obtained when in the state shown in FIG. 9H, the perfect binding process is added. When the process button 929 for adding the perfect binding process is pressed, the detail setting control 930 for the perfect binding is displayed. The perfect binding process is allowed to be set only once, and the process button 929 is disabled to prevent the perfect binding process from being added multiple times. The process icon 931 indicating the perfect binding process is displayed such that it is connected to the process icon 925 indicating the printing process. FIG. 9J shows a state obtained when in the state shown in FIG. 9I, three-side cutting process is added. When a process button 932 for adding a three-side cutting process is pressed, a three-side cutting detail setting control 933 is displayed. The three-side cutting process is allowed to be set only once. Therefore, the process button 932 is disabled so that it can not be added a plurality of times. The process icon 934 indicating the three-side cutting process is displayed such that it is connected to the process icon 931 indicating the perfect binding. Based on the order information shown in FIG. 5B, the three-side cutting process is added. After the setting of the perfect binding process and three-side cutting process is performed, if the save button 908 is pressed, the setting of the workflow of the body part is ended.

In S426, a process icon indicating a workflow process is displayed in an area associated with a part of interest according to the workflow setting set in S425. The workflow editing unit 303 acquires the setting of the workflow process corresponding to the part of interest from the RAM 203, and displays, via the UI unit 302, a process icon indicating the workflow setting on the workflow edit screen. FIG. 7C shows a state obtained when in the state shown in FIG. 7B, the workflow setting of the body part described above with reference to FIG. 9A to FIG. 9J is performed. The process icons 901 set in FIG. 9J is displayed (as 710) in connection with the icon 707 indicating the body part.

In S427, it is determined whether the workflow process is completed for all parts. Upon receiving a notification via the UI unit 302 that the save button 701 or the cancel button 702 is pressed by a user, the workflow editing unit 303 determines that the workflow editing has been completed. In a case where the editing is ended in response to the save button 701 being pressed, the processing flow proceeds to S428. In a case where the editing is ended in response to the cancel button 702 being pressed, the process according to the present flow chart is ended. When the workflow setting of a part is to be further performed, the processing flow proceeds to S405. When the necessary setting of the workflow process is completed for all parts such as the cover, the body, the front page, and the wraparound band, a user presses the save button 701 to end the setting. In a case where the save button 701 is pressed, the edited content of the workflow is finalized, and the processing flow proceeds to a next step. On the other hand, in a case where the cancel button 702 is pressed, the edited content of the workflow is discarded and the processing of this flowchart is ended. FIG. 7D shows a state in which process icons 711 of the cover part are displayed after the workflow of the cover part is set in the state shown in FIG. 7C. In the process icons 711, the imposition process, the barcode process, the register mark process, and the printing process are set. 712 indicates that the printing process of the cover part is connected to the perfect binding process of the body part. 7E shows a state in which settings are performed for the parts of the front page and for parts of the wraparound band in the state shown in FIG. 7D, and, as a result, the process icons 713 of the front page parts and the process icons 714 of the workflow parts are displayed. The process icon 713 of the front page part is in a state where the imposition process and the printing process are set. The process icon 714 for the wraparound band part is in a state in which the imposition process, the printing process, and the cut and crease process (715) are set. When the save button 701 is pressed, the edited content of the workflow for each part is finalized.

In S428, the set content of the set workflow process is stored as workflow information in the workflow DB 306. FIG. 12 illustrates an example of a workflow information table. FIGS. 13A to 13D respective illustrate examples of information tables on parts referred to from the workflow information table. Using these two types of information tables, the information on the workflow is managed. The workflow information table in FIG. 12 describes IDs for uniquely identifying workflows, and information indicating the names, product types, and parts set via the above-described new workflow creation screen. As for parts, an ID for uniquely identifying each part is stored in the workflow information table. The IDs for uniquely identifying workflows and the IDs for uniquely identifying parts are automatically set by the system. FIG. 13A illustrates an information table for cover parts. FIG. 13B illustrates an information table for body parts. FIG. 13C illustrates an information table for front page parts. FIG. 13D illustrates an information table of wraparound band parts. The part information table describes IDs corresponding to the part IDs described in the workflow information table in FIG. 12 and setting values of each process set on the workflow process setting screens show in FIGS. 9A to 9J. For example, a part #2 with an ID of "001-B001" of a body of a part #2 of a workflow (with a name of "XXX manual") with an ID of "001" in FIG. 12 is associated with an ID "001-B001" in the body part information table in FIG. 13B in which setting values of respective process of the part #2 "body" (for example, the paper width and the paper height of paper in the imposition process in prepress are set as 224 and 335, respectively). In step S428, the workflow editing unit 303 converts, via the workflow management unit 305, the setting values of the workflow temporarily stored in the RAM 203 into the format illustrated in FIG. 12 and FIGS. 13A to 13D, and stores the result, as workflow information, in the workflow DB 306. Note that in the order system that inputs the order in the print job management application 308, correspondence between a content of the order and an associated ID uniquely identifying the workflow shown in FIG. 12 is defined in advance. As a result, a print job corresponding to the order received by the order system can be generated according to the setting of the workflow set by the workflow setting application 301.

Thus, according to the above-described process, it is possible to create a workflow for producing a product by specifying parts constituting the product and inputting setting values of the workflow process on each screen displayed for each specified part.

Figure 14:
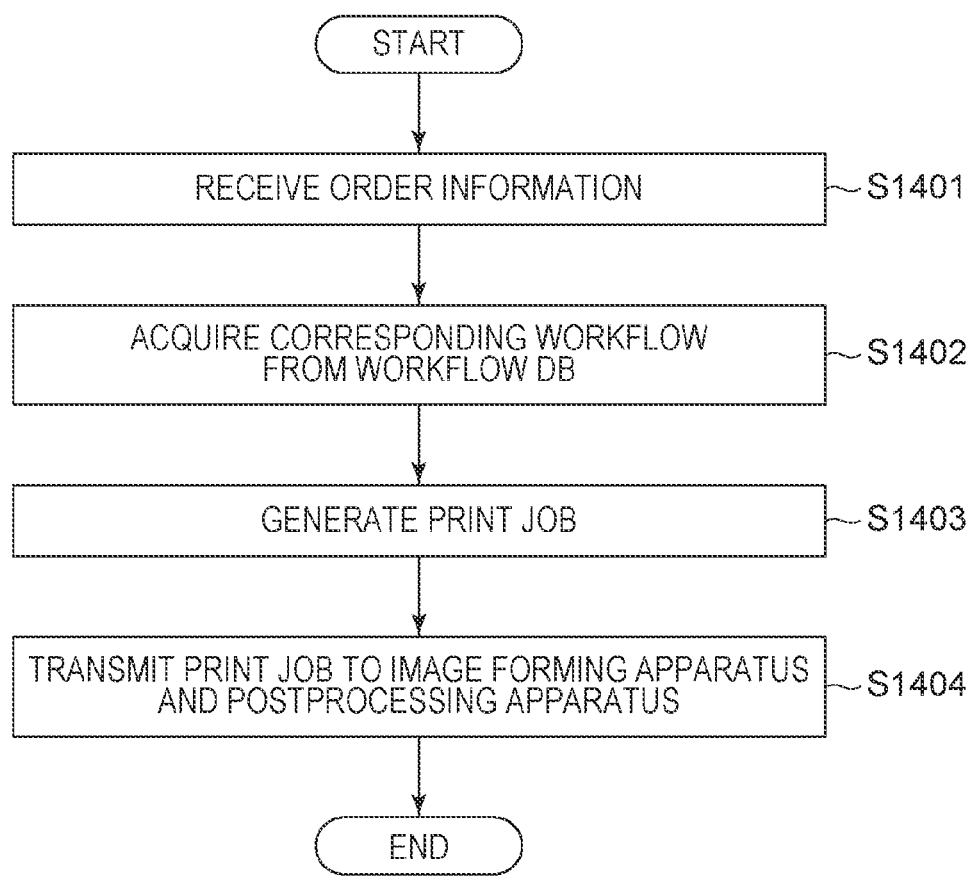
FIG. 14 is a flow chart illustrating a print job transmission process.

FIG. 14 is a flow chart illustrating a process performed by the print job management application 308 to transmit a print job to the image forming apparatus 102 and the post-processing apparatus 103 according to the set workflow. Each processing step is described below.

In S1401, the print job management application 308 receives order information. The order information may be transmitted from another order system, or a folder on the information processing apparatus 101 may be monitored to detect job data copied to the folder. The order information includes document data (for example, PDF) necessary for generating a print job and also includes a workflow ID of a workflow that processes the order. The workflow ID corresponds to the ID in FIG. 12 described above.

In a processing step S1402, workflow information linked to the workflow ID of the received order information is acquired from the workflow DB 306. For example, in a case where the workflow ID described in the order information is "004", the workflow information stored in the workflow DB 306 is accessed to acquire information on the workflow having the same ID. In the example shown in FIG. 12, workflow information of the name "XXX booklet" whose ID is "004" is acquired.

In a processing step S1403, a print job is generated based on the acquired workflow information. The print job management application 308 processes the document data acquired as the order information based on the acquired workflow information (FIG. 12 and FIGS. 13A to 13D referred to) to generate a job ticket describing an instruction given to the image forming apparatus 102 and post-processing apparatus 103.

In step S1404, the print job management application 308 transmits the print job including the generated document data and job ticket to the predetermined image forming apparatus 102 and post-processing apparatus 103. The transmission of the print job may be instructed by a user via the user interface of the print job management application 308, or may be automatically transmitted in response to receiving the order information in S1401.

By performing the process according to the present flowchart, it is possible to generate a print job corresponding to a received order based on workflow information set by the workflow setting application 301.

In the embodiment described above, a workflow is generated such that the workflow has information indicating whether each process is essential or not and such that the workflow includes an essential process as shown in FIG. 5B. However, the workflow may be generated such that it does not have information as to whether each process essential or not. For example, the imposition is effective in a case where setting made by another application is imported, or in a case where a box or a similar product is produced via a process including no printing process.

Second Embodiment

A second embodiment of the present invention is described below. A description of the same elements as those in the first embodiment is omitted. The second embodiment discloses a process of automatically setting parts depending on a product type set in a new workflow creation process.

Figure 6A:
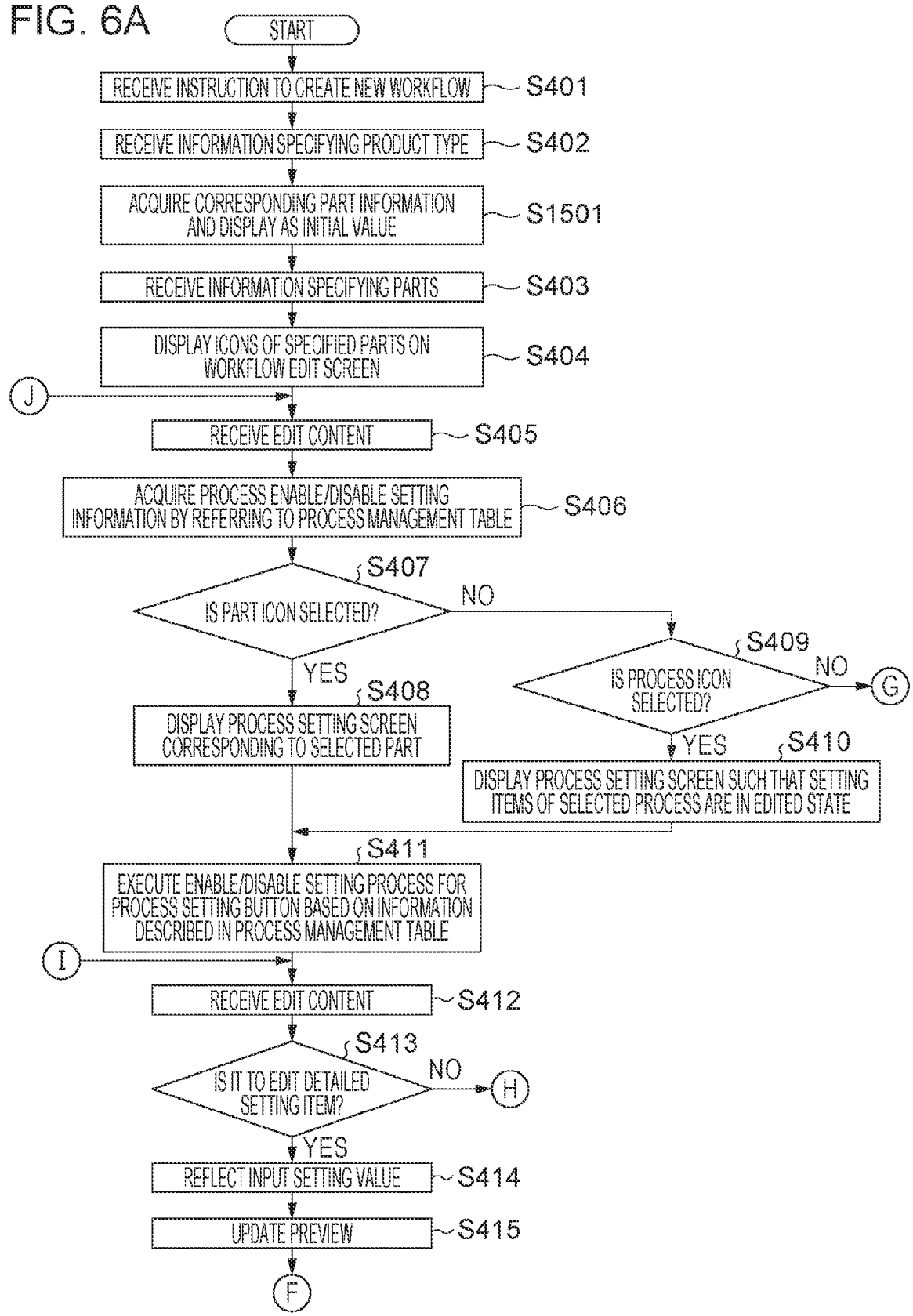
FIGS. 6A and 6B are flow charts illustrating a workflow creation process according to a second embodiment.
Figure 6B:
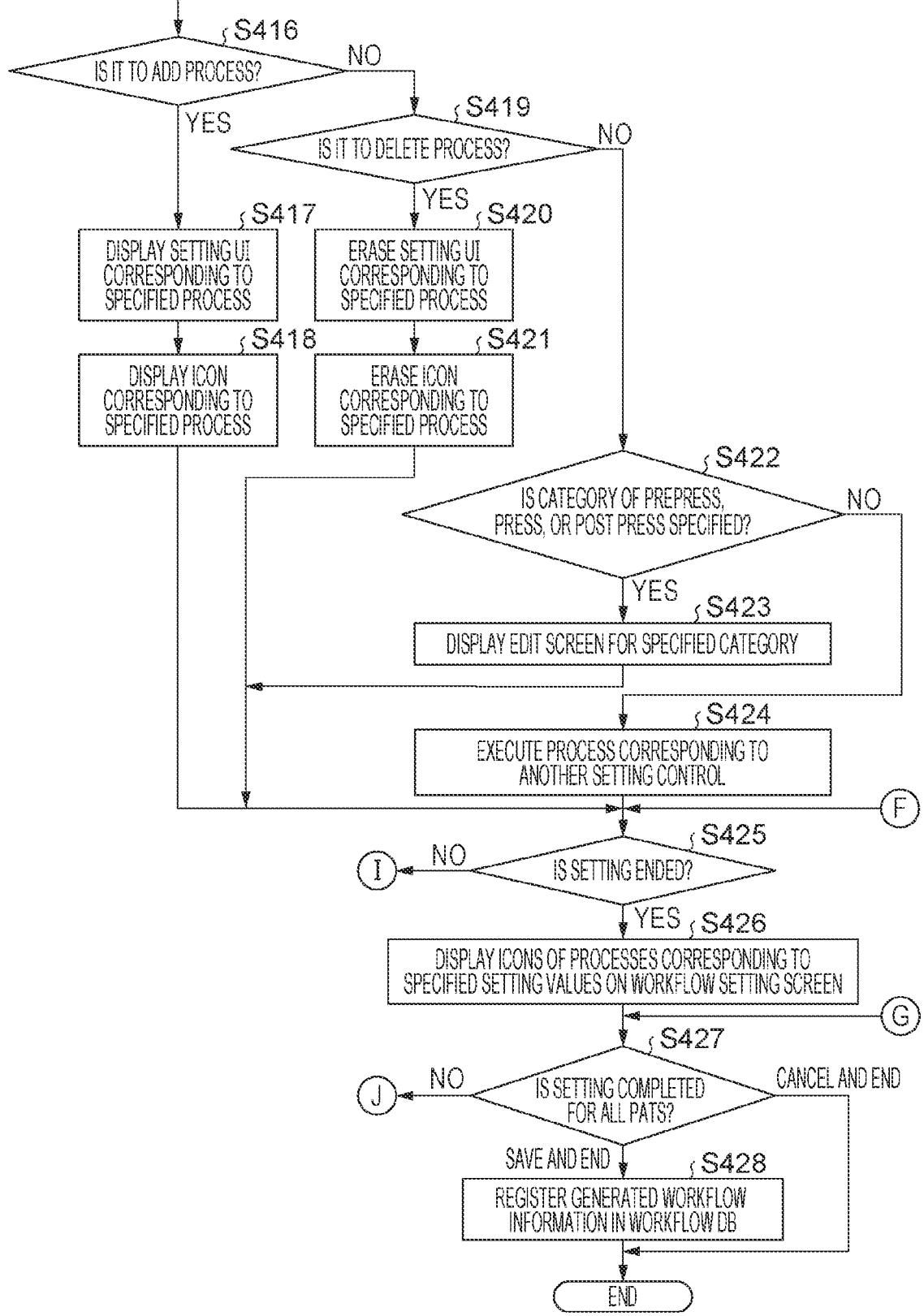

FIGS. 6A and 6B are flow charts illustrating a workflow setting process and a registration process performed by the workflow setting application according to the second embodiment. The workflow setting process is described below with reference to a new workflow creation screen shown in FIGS. 8A and 8B and the product type vs. part correspondence table shown in FIG. 10. Note that similar processing step to those in the first embodiment described above with reference to FIG. 4 are denoted by similar step numbers, and a description thereof is omitted.

Figure 8A:
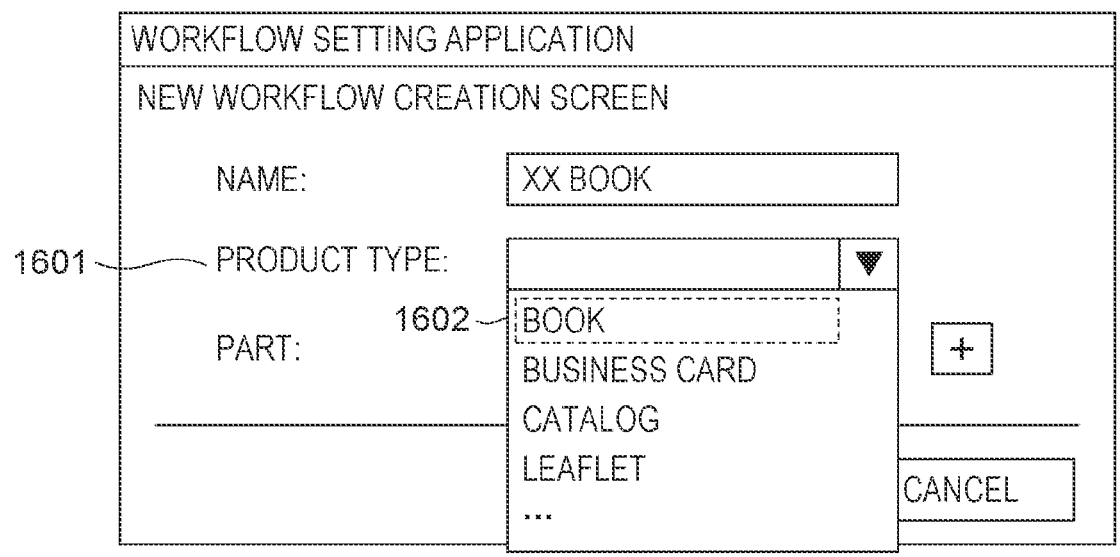
FIGS. 8A and 8B are diagrams illustrating an example of a new workflow creation screen according to a second embodiment.
Figure 8B:
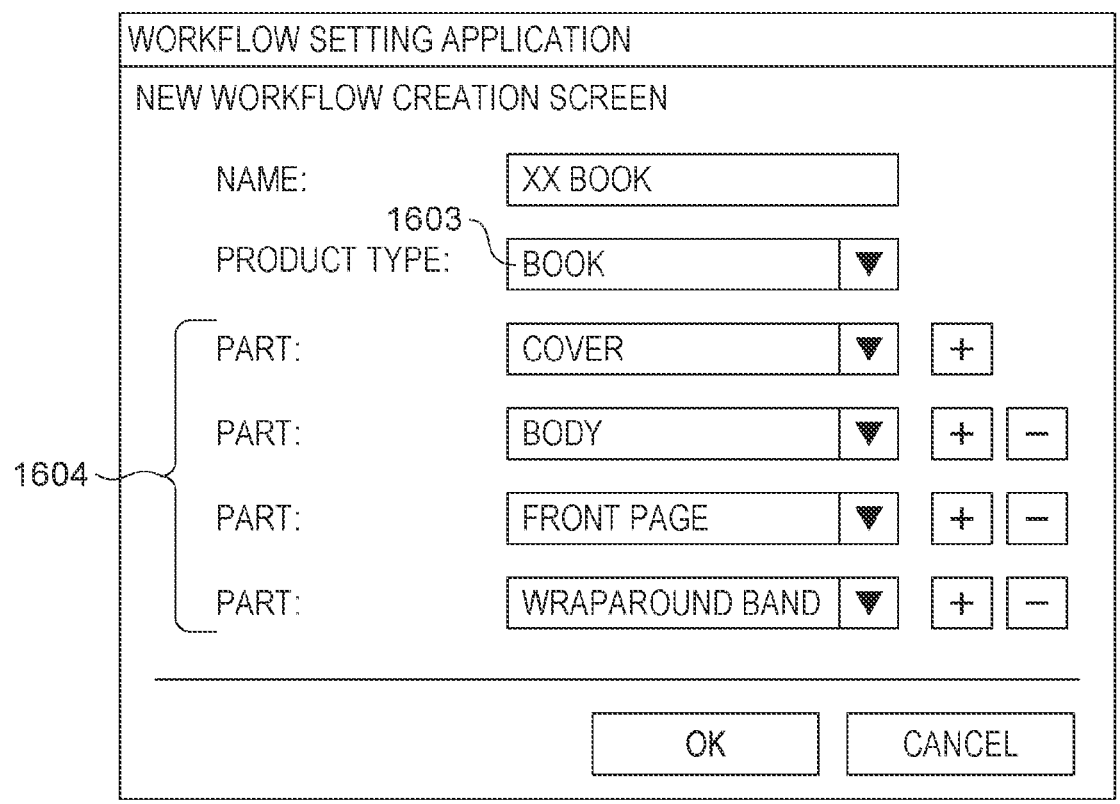

In a processing step S1501, part information on parts corresponding to the product type specified via the new workflow creation screen is acquired and is set as initial values of the parts. FIG. 10 is a diagram illustrating an example of a product type/part correspondence table in which product types and recommended parts for the corresponding product types are described. For example, information of four parts, that is, the cover, the body, the front page, and the wraparound band for the book, and information of two parts, that is, the cover and the body for the catalog are described. The workflow control unit 304 acquires the product type/part correspondence table thereby acquiring information on parts corresponding to the product type received in the previous processing step. In a case where the book is specified as the product type, information of four parts, that is, the cover, the body, the front page, and the wraparound band is acquired. The workflow editing unit 303 sets the information on the parts acquired by the workflow control unit 304 as initial values of the specified product type. The workflow editing unit 303 displays the parts set as the initial values on the new workflow creation screen via the UI unit 302. FIG. 8A illustrates an example in which a product type is set on the new workflow creation screen. In this example, a drop-down list of choices for the product type appears in a list box 1601 for specifying a product type, and a book is selected as the product type using the pointing device 206. FIG. 8B shows a state immediately after the product type is set on the new workflow creation screen. Via the process in S1501, four parts 1604 of the cover, the body, the front page, and the wraparound band corresponding to the book 1603 set as the product type book are automatically set. Note that the parts are automatically set as initial values, and it is allowed for a user to change them appropriately.

Via the above process, it becomes possible to automatically set the corresponding parts depending on the product type set in the new workflow creation process. Thus, it becomes unnecessary to set the parts individually.

The embodiments described above provide a user interface for use in generating a workflow, which allows a user to easily set a process and to easily set a parameter of the process. In the middle of creating a workflow by adding or deleting processes, a user is allowed to set process parameters at the timing of issuing an instruction to add a process. Thus, the user is allowed to easily set the workflow. The process specifying area and the process parameter setting area are located on the same screen, and thus the user is allowed to easily perform setting operations.

According to the embodiments described above, it becomes possible to create a variable workflow of generating a product simply by specifying parts to be included in the product and inputting setting values for each of the specified parts displayed on the setting screen without having to pay an attention to a relationship among processes or restrictions.

Other Embodiments

The present invention may also be realized by executing a process as described below. That is, software (program) for realizing functions of the above-described embodiment is supplied to a system or apparatus via a network or various types of storage media, and a computer (or a CPU, an MPU or the like) of the system or apparatus reads the program and executes it.

The embodiments described above provide a user interface for use in generating a workflow, which allows a user to easily set a process and to easily set a parameter of the process.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory device that stores a set of instructions; and
at least one processor that, when executing the set of instructions, causes the information processing apparatus to perform operations comprising:
displaying a first setting screen for generating a first print part among a plurality of print parts constituting a print product and for accepting, at least, an instruction to add processes including a processing process regarding post-print processing,
accepting the instruction to add processes including a combining process of combining the plurality of print parts via the first setting screen,
displaying a second setting screen for generating a second print part different from the first print part among the plurality of print parts and for accepting, at least, an instruction to add processes including a processing process regarding post-print processing,
accepting the instruction to add processes other than the combining process and not accepting an additional instruction to add the combining process via the second setting screen, and
based on the instruction to add processes accepted via the first setting screen and the instruction to add processes accepted via the second setting screen, generating a workflow for the print product constituted of the plurality of print parts, the workflow including the combining process for combining the plurality of print parts,
wherein, when the second setting screen is displayed, a display indicating that an additional instruction to add the combining process is not acceptable is displayed in an identifiable manner.

2. The information processing apparatus according to claim 1, wherein the process involving at least the first and second print parts is saddle stitching or perfect binding.

3. The information processing apparatus according to claim 1, wherein the first print part is a body part, and the second print part is a cover part.

4. The information processing apparatus according to claim 3, wherein the process involving at least the first and second print parts is a process of binding the body part and the cover part together.

5. The information processing apparatus according to claim 1, wherein each of the first setting screen and the second setting screen is a setting screen for accepting, at least, the instruction to add the processes including the processing process regarding the post-print processing and process setting regarding the post-print processing.

6. The information processing apparatus according to claim 5, wherein the workflow for the print product is generated based on the instruction to add the processes and based on the process setting regarding the post-print processing, received via the first setting screen and the second setting screen.

7. The information processing apparatus according to claim 1, wherein
the operations further comprise:
displaying a selection screen for selecting one print part among the plurality of print parts constituting the print product.

8. A method of controlling an information processing apparatus, the method comprising:
displaying a first setting screen for generating a first print part among a plurality of print parts constituting a print product and for accepting, at least, an instruction to add processes including a processing process regarding post-print processing,
accepting the instruction to add processes including a combining process of combining the plurality of print parts via the first setting screen,
displaying a second setting screen for generating a second print part different from the first print part among the plurality of print parts and for accepting, at least, an instruction to add processes including a processing process regarding post-print processing,
accepting the instruction to add processes other than the combining process and not accepting an additional instruction to add the combining process via the second setting screen, and
based on the instruction to add processes accepted via the first setting screen and the instruction to add processes accepted via the second setting screen, generating a workflow for the print product constituted of the plurality of print parts, the workflow including the combining process for combining the plurality of print parts,
wherein, when the second setting screen is displayed, a display indicating that an additional instruction to add the combining process is not acceptable is displayed in an identifiable manner.

9. The method according to claim 8, wherein the process involving at least the first and second print parts is saddle stitching or perfect binding.

10. The method according to claim 8, wherein the first print part is a body part, and the second print part is a cover part.

11. The method according to claim 10, wherein the process involving at least the first and second print parts is a process of binding the body part and the cover part together.

12. The method according to claim 8, wherein each of the first setting screen and the second setting screen is a setting screen for accepting, at least, the instruction to add the processes including the processing process regarding the post-print processing and process setting regarding the post-print processing.

13. The method according to claim 12, wherein the workflow for the print product is generated based on the instruction to add the processes and based on the process setting regarding the post-print processing, received via the first setting screen and the second setting screen.

14. The method according to claim 8, further comprising:
   displaying a selection screen for selecting one print part among the plurality of print parts constituting the print product.

* * * * *